(12) United States Patent
Zhao

(10) Patent No.: US 8,430,536 B1
(45) Date of Patent: Apr. 30, 2013

(54) LED LIGHTING SYSTEM INCLUDING TIR OPTIC

(71) Applicant: Zumtobel Lighting, Inc, Highland, NY (US)

(72) Inventor: Feng Zhao, Poughkeepsie, NY (US)

(73) Assignee: Zumtobel Lighting Inc., Highland, NY (US)

( * ) Notice: Subject to any disclaimer, the term of this patent is extended or adjusted under 35 U.S.C. 154(b) by 0 days.

(21) Appl. No.: 13/632,204

(22) Filed: Oct. 1, 2012

(51) Int. Cl.
*F21V 7/00* (2006.01)
*F21V 5/00* (2006.01)
(52) U.S. Cl.
USPC ....... 362/309; 362/308; 362/327; 362/311.02
(58) Field of Classification Search .......... 362/307–309, 362/296.01, 311.02, 327, 328, 335–338, 362/245; 359/642
See application file for complete search history.

(56) References Cited

U.S. PATENT DOCUMENTS

| | | | |
|---|---|---|---|
| 5,404,869 A | 4/1995 | Parkyn et al. | |
| 5,577,493 A | 11/1996 | Parkyn et al. | |
| 6,478,453 B2 * | 11/2002 | Lammers et al. | 362/294 |
| 7,258,467 B2 | 8/2007 | Saccomanno et al. | |
| 7,438,447 B2 | 10/2008 | Holder et al. | |
| 7,954,975 B2 | 6/2011 | Zhou | |
| 8,115,217 B2 | 2/2012 | Duong et al. | |
| 8,246,216 B2 * | 8/2012 | Jiang et al. | 362/308 |
| 2002/0135298 A1 | 9/2002 | Pelka et al. | |
| 2004/0119083 A1 | 6/2004 | Su et al. | |
| 2009/0129097 A1 * | 5/2009 | Ewert et al. | 362/328 |
| 2009/0290360 A1 * | 11/2009 | Wilcox et al. | 362/327 |
| 2010/0226127 A1 * | 9/2010 | Bigliatti et al. | 362/235 |
| 2010/0238645 A1 * | 9/2010 | Bailey | 362/84 |
| 2012/0320602 A1 * | 12/2012 | Riesebosch | 362/297 |

\* cited by examiner

*Primary Examiner* — Bao Q Truong
(74) *Attorney, Agent, or Firm* — Manuel F. de la Cerra

(57) ABSTRACT

Provided is a specially designed high efficiency optic utilizing Total Internal Reflection (TIR) that collimates light from a typical LED or similar light source. In certain example embodiments the light emitted from a single TIR optic is directed into any of a plurality of interchangeable high-efficiency reflectors that further direct and shape the light beam according to the interaction between the TIR optic and the geometries of the various reflectors. These features work together to efficiently provide a high-quality, substantially-collimated, narrow light beam with high luminous intensity, minimal glare and little to no striations, excellent color rendering, and symmetrical, smooth transitions from beam center to outer edge.

22 Claims, 33 Drawing Sheets

LED LIGHTING SYSTEM INCLUDING TIR OPTIC

CROSS-REFERENCE TO RELATED APPLICATIONS

None.

FEDERALLY SPONSORED RESEARCH OR DEVELOPMENT

None.

TECHNICAL FIELD

The present invention relates to lighting systems, and more particularly to lighting systems using a light emitting diode (LED).

BACKGROUND

LED lighting may be preferred in various applications due to its low power usage, relatively low heat generation, and robust reliability. However, LED lights typically produce low quality uncollimated light beams with undesirable glare, striations, poor color rendering, and nonsymmetrical, unsmooth transitions from beam center to outer edge. This can render LED lighting unacceptable for various applications, such as retail stores, showrooms, art galleries, and commercial spaces. Prior attempts to improve the quality of LED light have involved significant reduction of the optical efficiency of the lights, somewhat defeating the purpose of LED lights, and rendering low-powered LED lights too dim for many applications, especially narrow beam spot lights and the like. The following United States patents and published patent applications provide a detailed background description of the art and are hereby incorporated by reference into this document in their entireties for all purposes, as though set forth fully herein: U.S. Pat. No. 5,404,869; U.S. Pat. No. 5,577,493; U.S. Pat. No. 7,258,467 B2; U.S. Pat. No. 7,438,447 B2; U.S. Pat. No. 7,954,975 B2; U.S. Pat. No. 8,115,217 B2; US 20020135298 A1; and US 20040119083 A1.

SUMMARY

The present invention solves these and other problems and provides numerous additional advantages by providing in various example embodiments a specially designed high efficiency optic utilizing Total Internal Reflection (TIR) that collimates light from a typical LED or similar light source. In certain example embodiments the light emitted from a single TIR optic is directed into any of a plurality of interchangeable high-efficiency reflectors that further direct and shape the light beam according to the interaction between the TIR optic and the geometries of the various reflectors. These features work together to efficiently provide a high-quality, substantially-collimated, narrow light beam with high luminous intensity, minimal glare and little to no striations, excellent color rendering, and symmetrical, smooth transitions from beam center to outer edge.

Provided in certain example embodiments is a lighting system comprising: an LED light source; a TIR lens adapted to be located proximate to and in light communication with the LED light source and transmit substantially all the light transmitted from the LED light source into the body of the TIR lens, the TIR lens further adapted to emit substantially all the light transmitted from the LED light source out of one or more surfaces adapted to be located proximate to a light reflector; and one or more light reflectors adapted to be located proximate to the light emitting surfaces of the TIR lens and to reflect and direct light emitted by the TIR lens.

When various example embodiments of the system are in use, the TIR lens may be located proximate to and in light communication with the LED light source and transmit substantially all the light transmitted from the LED light source into the body of the TIR lens, and the TIR lens may emit substantially all the light transmitted from the LED light source out of one or more surfaces that are located proximate to one or more light reflectors that reflect and direct the light emitted by the TIR lens.

In various example embodiments the TIR lens may be adapted to interchangeably interface with a plurality of light reflectors differing in geometries and light directing characteristics. The system may comprise a plurality of light reflectors differing in geometries and light directing characteristics, each light reflector being adapted to interchangeably interface with the TIR lens.

The light emitted by the system may be substantially collimated, substantially free of striations, and transition smoothly from center beam to outer edge. Substantially all the light emitted by the system may pass through the TIR lens. The optical efficiency of the system may be at least 80%, and the Full Width at Half Maximum (FWHM) generated by the system may be 12 degrees or less.

Provided in certain example embodiments is an optic comprising: a TIR lens defining a one-piece body having a truncated, conical upper portion, and a truncated conical lower portion, the lower portion positioned opposite the upper portion, the upper portion having an upper surface defining a first centrally-located conical recess into the body that is adapted to be located proximate to and in light communication with a LED light source and transmit substantially all the light transmitted from the LED light source into the body of the TIR lens, the remainder of the upper surface adapted by its geometry to mute the emission of light from inside the body by reflecting light back into the body, the lower portion having a lower surface adapted to emit substantially all the light from inside the body, the lower surface defining a second centrally-located conical recess into the body that is adapted by its geometry to at least partially mute the emission of light from inside the body by reflecting at least a portion of the light back into the body.

In various example embodiments of the optic, the outer surface of the conical upper portion defines a convex profile, and the inner surface of the first centrally-located conical recess defines a convex profile. The body of the optic may comprise optical grade polymethylmethacrylate (PMMA), and may be formed by injection molding.

Also provided in certain example embodiments is a lighting system comprising: an LED light source; a TIR lens defining a one-piece body having a truncated, conical upper portion, a truncated conical lower portion, and an interstitial portion, the lower portion positioned opposite the upper portion and the interstitial portion positioned between the upper and lower portions, the upper portion having an upper surface defining a first centrally-located conical recess into the body that is adapted to be located proximate to and in light communication with the LED light source and transmit substantially all the light transmitted from the LED light source into the body of the TIR lens, the remainder of the upper surface adapted by its geometry to mute the emission of light from inside the body by reflecting light back into the body, the lower portion having a lower surface adapted to emit substantially all the light from inside the body, the lower surface defining a second centrally-located conical recess into the body that is adapted by its geometry to at least partially mute the emission of light from inside the body by reflecting at least a portion of the light back into the body, the interstitial portion adapted to be located proximate to an opening in an upper surface of a light reflector; and a light reflector comprising a housing having an upper edge defining a first opening adapted to be located proximate to the interstitial portion of the TIR lens and to allow light emitted from the lower surface to travel into the housing, the housing having a lower edge opposite the upper edge and defining a second opening larger in area than the first opening, the second edge separated from the first edge by one or more sides having one or more reflective inner surfaces, at least a portion of the reflective inner surfaces oriented to be in light communication with the lower surface of the TIR lens and to reflect light emitted from the lower surface of the TIR lens and direct that reflected light through the second opening in the light reflector housing.

In various example embodiments of the TIR lens, the outer surface of the conical upper portion defines a convex profile, and the inner surface of the first centrally-located conical recess defines a convex profile. The body of the optic may comprise optical grade polymethylmethacrylate (PMMA), and may be formed by injection molding. In various example embodiments the one or more reflective inner surfaces of the light reflector comprise an array of planar reflective surfaces.

When various example embodiments of the system are in use, the TIR lens may be located proximate to and in light communication with the LED light source and transmit substantially all the light transmitted from the LED light source into the body of the TIR lens, and the TIR lens may emit substantially all the light transmitted from the LED light source out of the lower surface and into the light reflector housing, which is located proximate to the TIR lens and which reflects and directs the light emitted by the TIR lens.

Further details regarding example embodiments of the invention are provided below with reference to the accompanying example figures. Additional aspects, alternatives and variations as would be apparent to persons of skill in the art are also disclosed herein and are specifically contemplated as included as part of the invention, which is limited not by any example but only by the claims.

BRIEF DESCRIPTION OF THE DRAWINGS

The following figures illustrate certain aspects of the design and utility of example embodiments of the invention.

DETAILED DESCRIPTION OF EXAMPLE EMBODIMENTS

Figure 1:
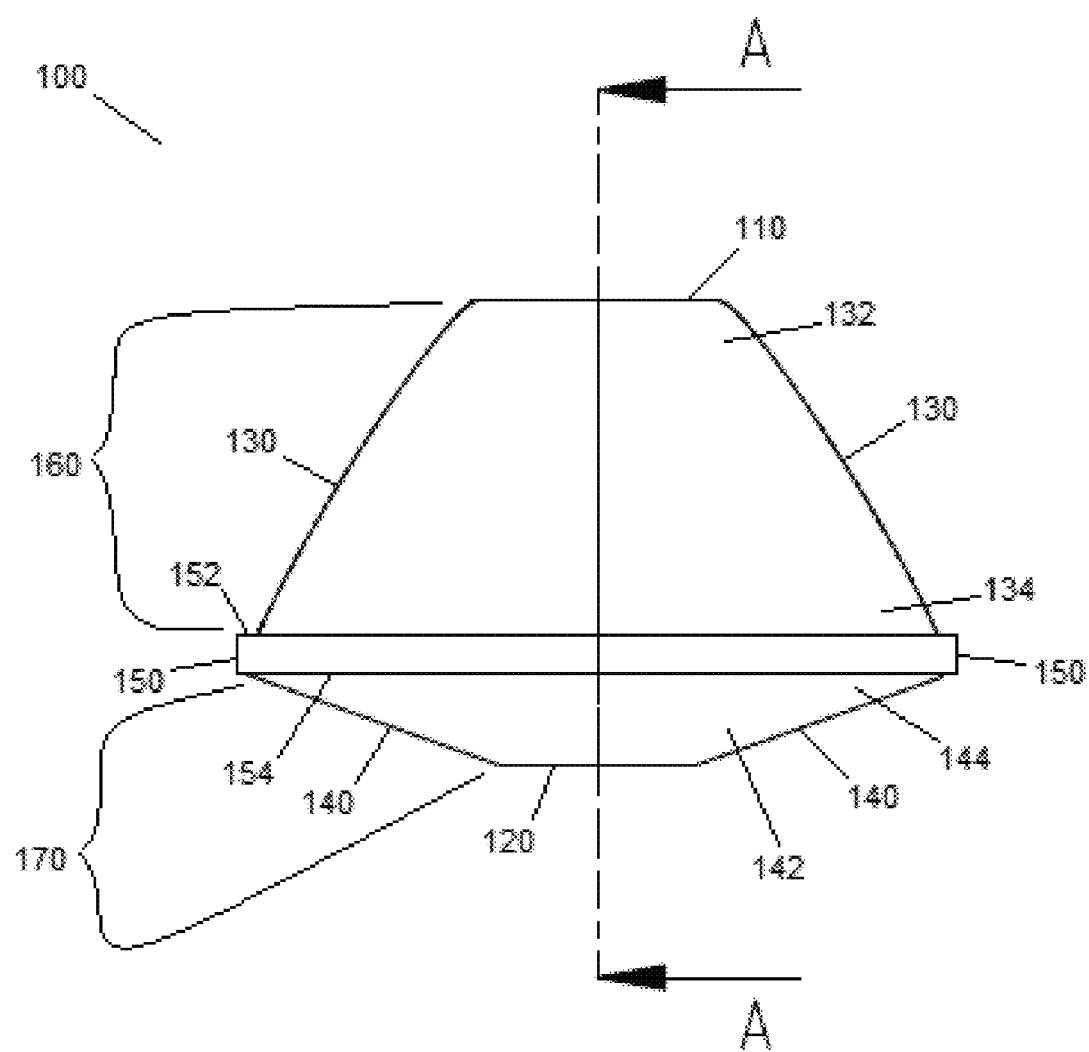
FIG. 1 is a side elevation view of an example embodiment of an optic adapted to utilize Total Internal Reflection (TIR) to collimate light from an LED and emit it into a reflector to efficiently create a high quality light beam (hereafter a "TIR lens").
Figure 2:
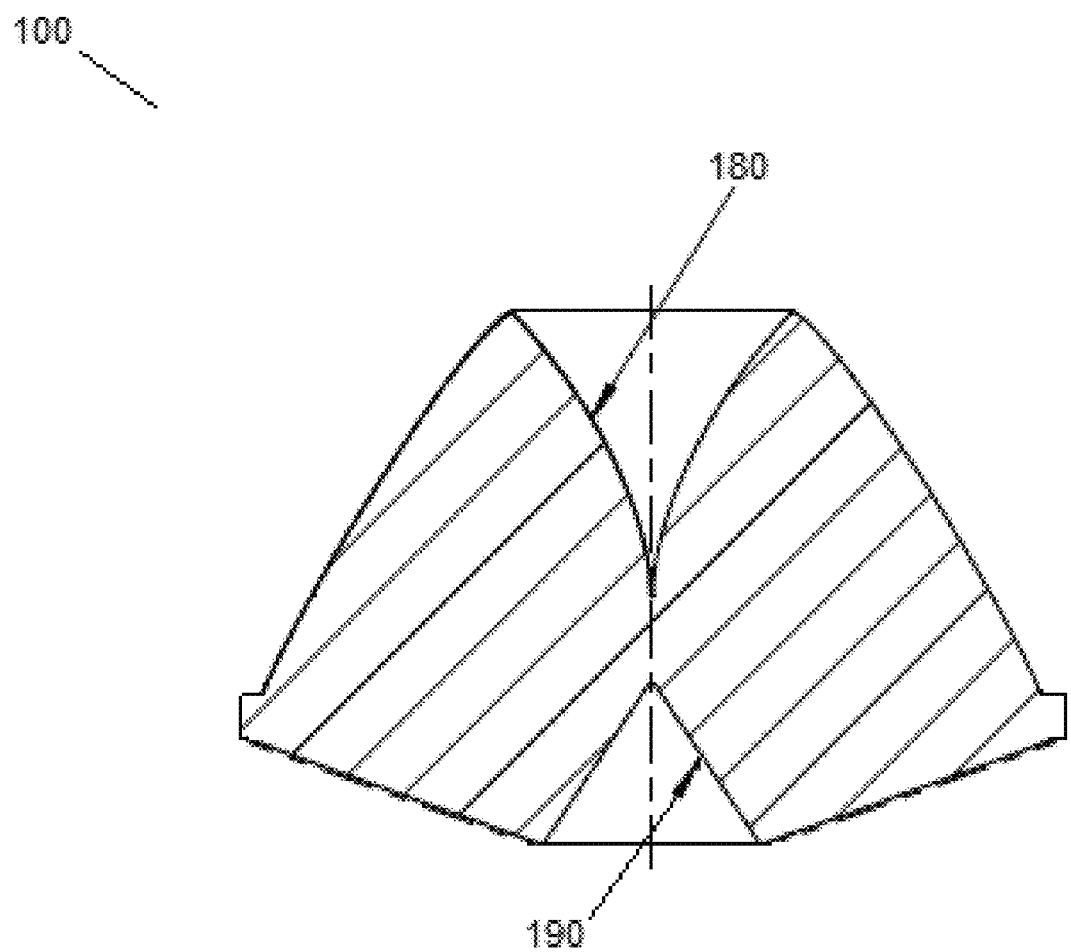
FIG. 2 is a side elevation view of the example TIR lens of FIG. 1, sectioned through line A-A.
Figure 3A:
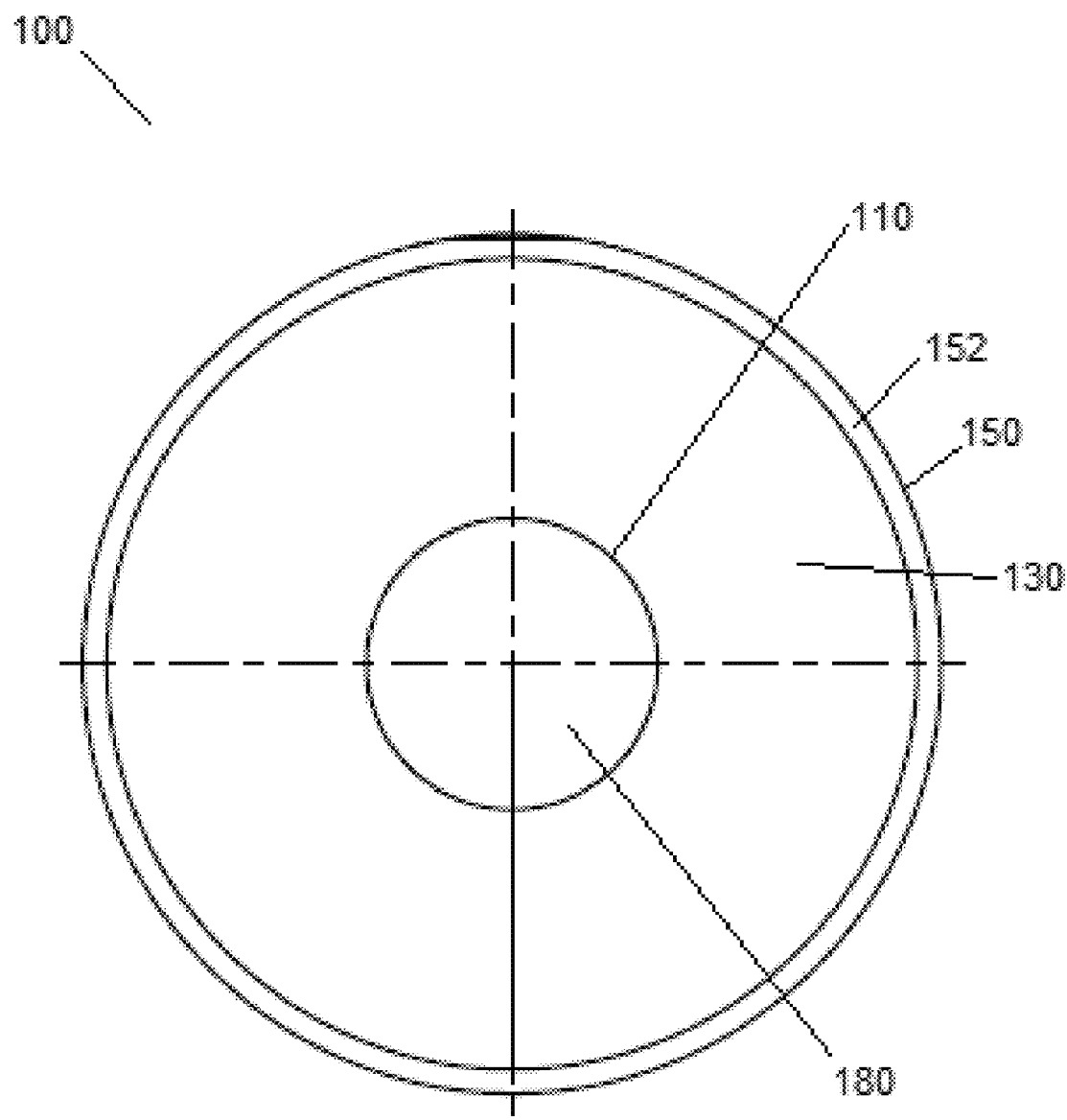
FIG. 3A is a top plan view of the example TIR lens of FIG. 1.
Figure 3B:
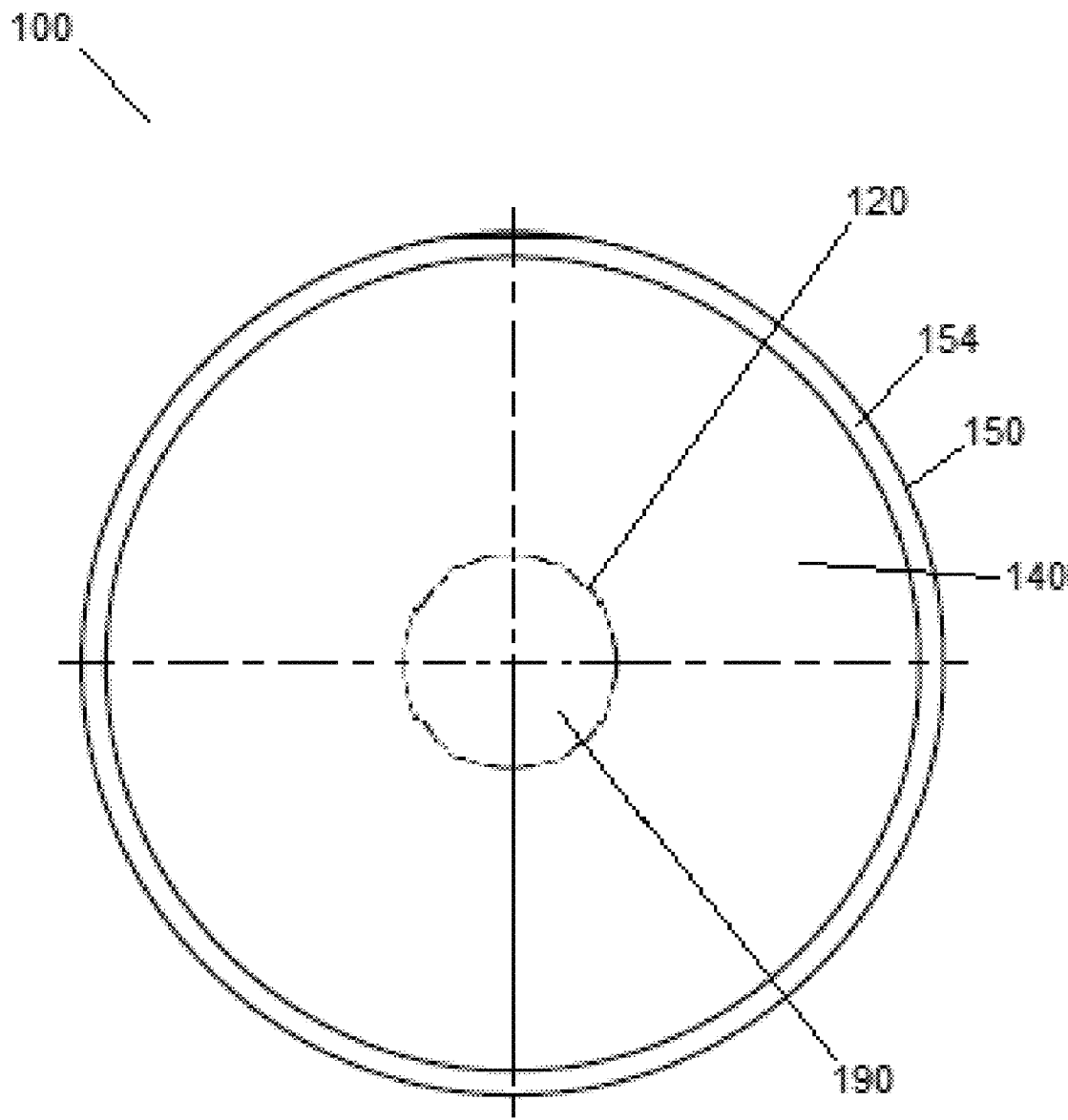
FIG. 3B is a bottom plan view of the example TIR lens of FIG. 1.
Figure 4:
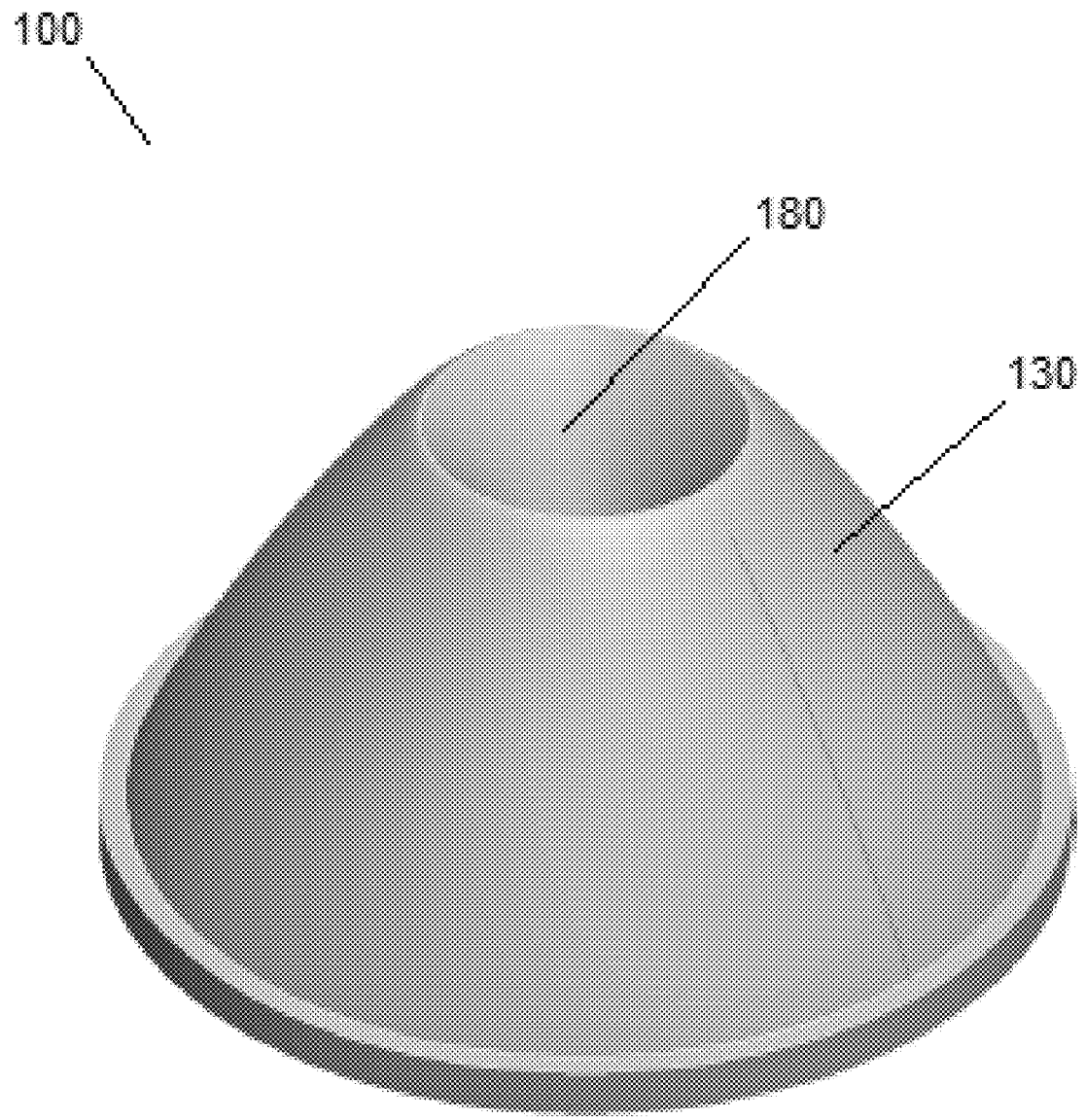
FIG. 4 is a top perspective view of the example TIR lens of FIG. 1.
Figure 5:
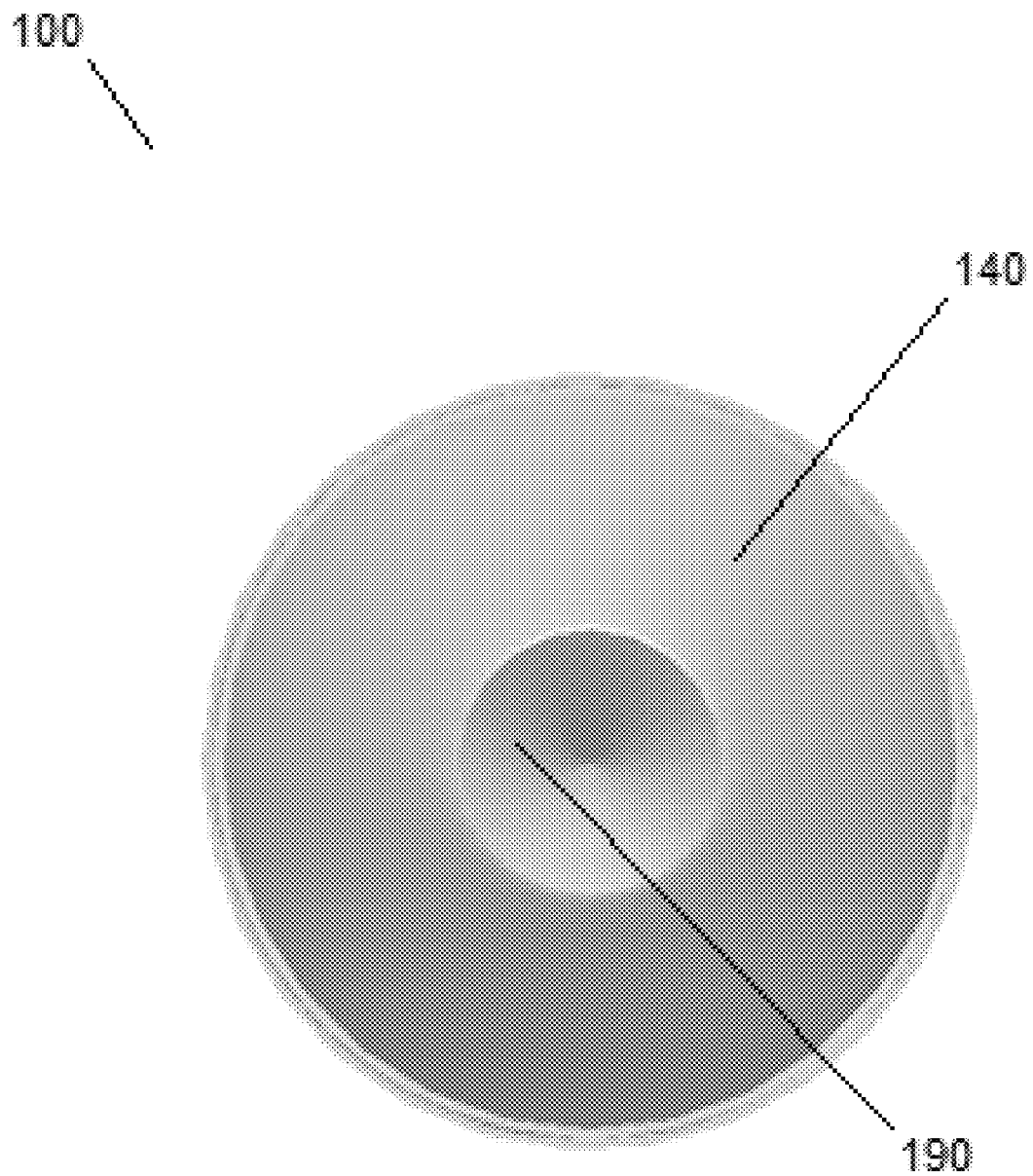
FIG. 5 is a bottom plan view of the example TIR lens of FIG. 1.
Figure 6:
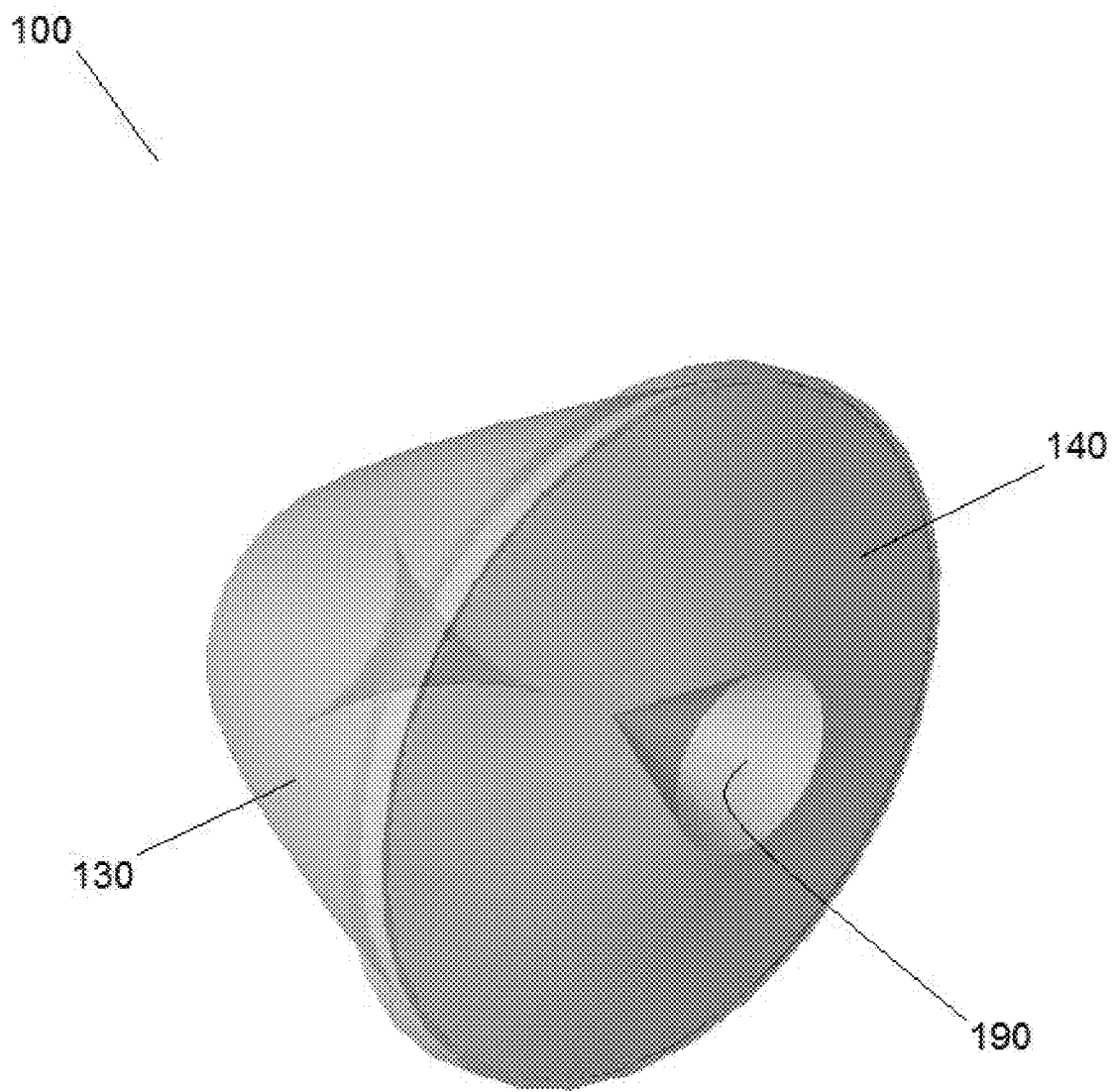
FIG. 6 is a bottom perspective view of the example TIR lens of FIG. 1.

Reference is made herein to some specific examples of the present invention, including any best modes contemplated by the inventor for carrying out the invention. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, certain specific details are set forth in order to provide a thorough understanding of the present invention. Particular example embodiments of the present invention may be implemented without some or all of these specific details. In other instances, device features well known to persons of skill in the art have not been described in detail in order to not obscure unnecessarily the present invention. The invention is scalable, and is not limited to any particular dimensions except where specifically claimed. Reference is made in various descriptions to "upper" and "lower" features, as well as "left" and "right" features. This language is provided for convenience of understanding in connection with the figures as presented and normal operation of a typical embodiment of a downward-shining light system. However, in any given embodiment or installation an "upper" surface or feature might actually be below a "lower" surface or feature, and "left" and "right" features may be reversed. These terms are meant to act as easily understood names distinguish corresponding features and are not to be construed as literal limitations on relative position or elevation.

Example aspects, components and features of various embodiments of the present system 1000 are illustrated in FIGS. 1 through 31 and are described below. Example light sources that may be used in connection with the system 1000 include any suitably sized LED light source, or any other point source or finite source of light, whether or not it actually comprises a light emitting diode (herein collectively referred to as "LED" light sources). For instance, in one embodiment of the system 1000 a chip-on-board (COB) LED light source was used having the following characteristics: 10 W DC; approximately 1000 lm; package size of 16 mm×19 mm; emitting-area diameter of 9 mm, and thermal resistance of 2° C./W. Since the LED light source may be any standard item it is not depicted in the figures other than being indicated as located as the source of the light 700, 720 proximate the top and center 110 of the optic 100 described below.

Turning to FIGS. 1 through 7, depicted is an example embodiment of a specially designed high efficiency optic 100 geometrically adapted to achieve Total Internal Reflection (TIR) when used with an LED light source as described herein (hereafter, a "TIR lens"). Provided in this example embodiment is a TIR lens defining a one-piece body 100 having a truncated, conical upper portion 160, a truncated conical lower portion 170, and an interstitial portion 150, the lower portion 170 positioned opposite the upper portion 160 and the interstitial portion 150 positioned between the upper and lower portions 160, 170, the upper portion 160 having an upper surface 110 defining a first centrally-located conical recess 180 into the body 100 that is adapted to be located proximate to and in light communication with a LED light source as described herein and transmit substantially all the light 700, 720 transmitted from the LED light source into the body 100 of the TIR lens as shown, for instance, in FIG. 7. The remainder of the upper surface 130, 132, 134 is adapted by its geometry to mute the emission of light 700, 720 from inside the body 100 by reflecting light 700, 720 back into the body 100, the lower portion 170 having a lower surface 120, 140, 142, 144 adapted to emit substantially all the light 700, 720 from inside the body 100. The lower surface 120 defines a second centrally-located conical recess 190 into the body 100 that is adapted by its geometry to at least partially mute the emission of light 700, 720 from inside the body 100 by reflecting at least a portion of light 700, 720 back into the body 100. It is understood that the specific rays of light 700, 720 illustrated in the Figures indicate example directions that light travels through the optic 100, and that in practice the entire optic 100 is filled with internally-reflected light 700, 720 according to the geometry of the optic 100 and the LED light source. Since the LED light source is located directly above the conical recess 190, the conical recess 190 serves to block from a viewer's eyes the most intense light from the LED light source, reducing glare and preventing a viewer external to the system from seeing an image of the LED light source. Conical recess 190 further serves to reduce the mass of optic 100 and make the optic 100 more readily moldable. The interstitial portion 150 defines one or more ridges 152, 154 adapted to be located proximate to and interface with the upper opening 840 in upper surface 810 of any of a variety of light reflector housings 800, described below with reference to FIGS. 8-16 and 26-31. In the embodiment shown, the interstitial portion 150 may be adapted by its geometry to at least partially mute the emission of light 700, 720 from inside the body 100 by at least a portion of the reflecting light 700, 720 back into the body 100. In other example embodiments not shown, the interstitial portion 150 may be omitted.

In the example TIR lens embodiment shown, the outer surface 130, 132, 134 of the conical upper portion 160 defines a convex profile, i.e., it curves radially outward as it extends from the upper part 132 of the outer surface 130 to the lower part 134. In other embodiments with different geometry the outer surface 130, 132, 134 may be straight, concave, or any other suitable profile. Also in the example embodiment shown, the inner surface 180 of the first centrally-located conical recess into the body 100 defines a convex profile, i.e., it curves radially inward into the recess as it extends from the upper surface 110 toward the center of the body 100. In other embodiments with different geometry the inner surface 180 may be straight, concave, or any other suitable profile. In contrast, in the embodiment shown the second centrally-located conical recess 190 has inner surfaces that are straight, not convex. In other embodiments with different geometry the inner surface 190 may be convex, concave, or any other suitable profile.

The body 100 of the TIR lens is preferably but not necessarily formed in one-piece, for instance by injection molding or press molding. The body 100 may be formed from any material providing suitably high optical efficiency, such as optical grade Polymethylmethacrylate (PMMA). PMMA typically provides a refractive index of about 1.4893 to 1.4899. Other potentially suitable materials for the body 100 include Acrylic glass (refractive index of about 1.49 to 1.492), Polycarbonate (refractive index of about 1.584 to 1.586), Polyethylene Terephthalate (PET) (refractive index of about 1.575), crown glass (refractive index of about 1.50-1.54), and Pyrex glass (refractive index of about 1.47) In one example embodiment the body 100 was formed by injection molding PMMA-EVONIK 8N, with refractive index 1.49 and temperature deflection under load less than 98 degrees Celsius. In that embodiment the upper surface 130, 132, 134 was given an outer surface irregularity treatment of SPI-A2 or equivalent, the lower surface 120, 140, 142, 144 was given an outer surface finish of MT-11000 or equivalent, and the remaining surfaces were optically clear.

Figure 7:
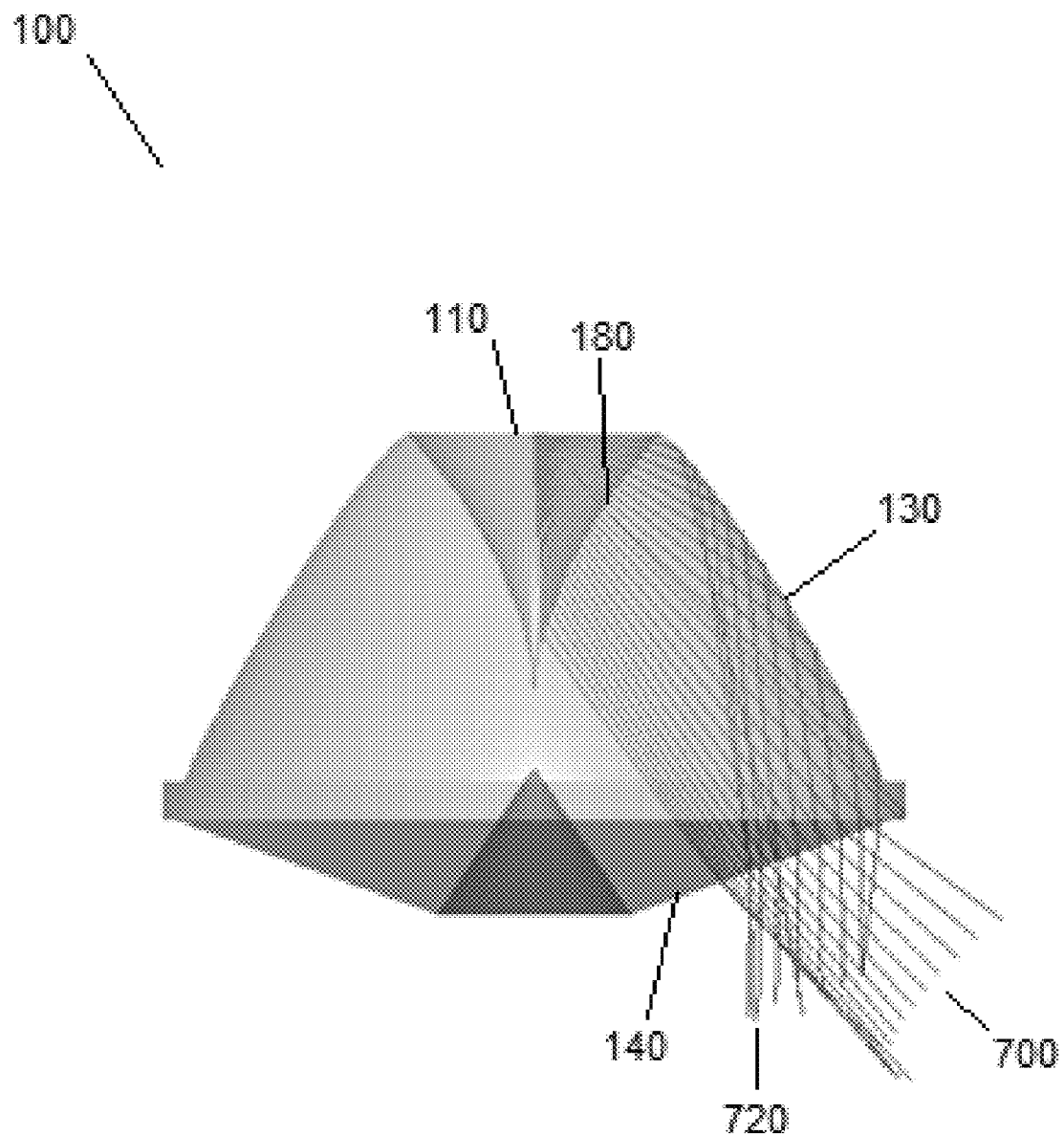
FIG. 7 is a side elevation view of the example TIR lens of FIG. 1, showing example light paths through the TIR lens.

FIG. 7 depicts the flow of example rays of light 700, 720 from an LED light source located proximate the upper surface 110 of the body 100. As depicted by lines 700, some of the light flows into the body 100 through the right side of the conical recess 180 and straight through the body 100, exiting lower surface 140 without being reflected inside the body 100. And as depicted by lines 720, other light flows into the body 100 through the right side of the conical recess 180 and reflects internally off the outer profile 130 of the upper portion 160 of the body 100 before exiting the lower surface 140.

Figure 8A:
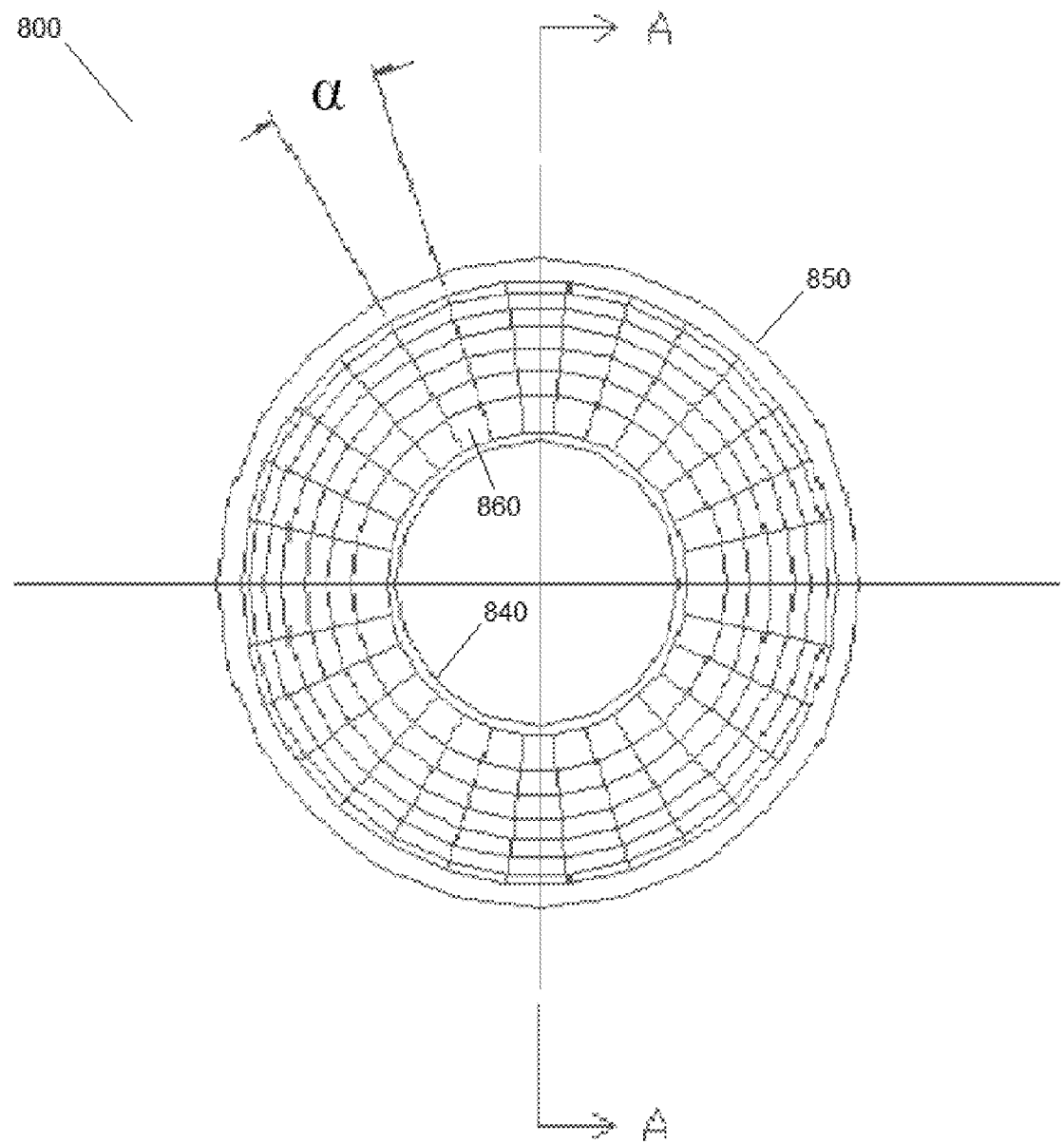
FIG. 8A is a bottom plan view of an example embodiment of a light reflector.
Figure 8B:
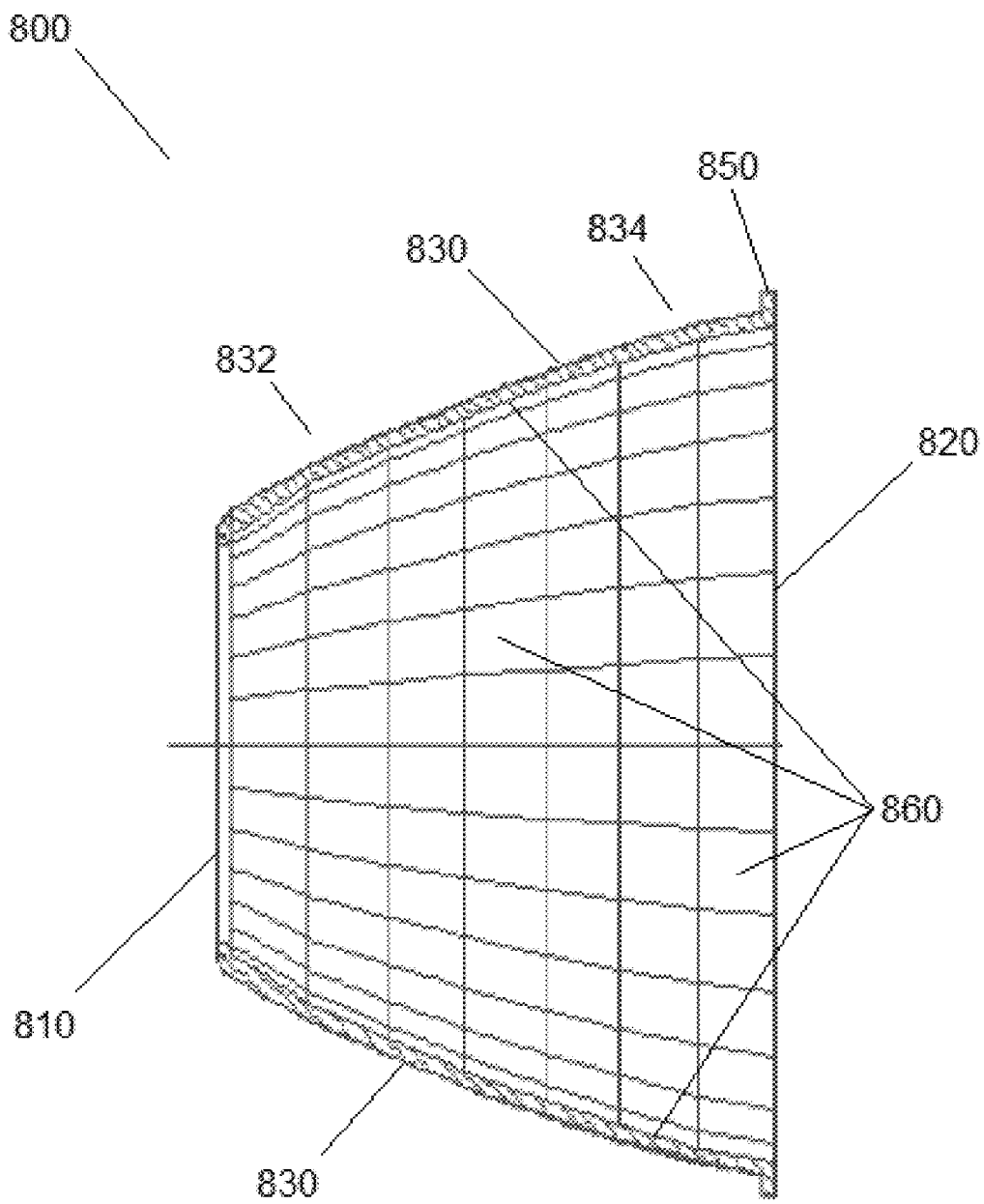
FIG. 8B is a side elevation view of the example light reflector of FIG. 8A, sectioned through line A-A.

Turning to FIGS. 8-16, example light reflectors 800 will now be described. Provided in this example embodiment is a light reflector comprising a housing 800 having an upper edge 810 defining an upper opening 840 adapted to be located proximate to the interstitial portion 150 of the TIR lens body 100 and to allow light 700, 720 emitted from the lower surface 140 to travel into the housing 800, the housing 800 having a lower edge 820 opposite the upper edge 810 and defining a lower opening 850 larger in area than the upper opening 840, the lower edge 820 separated from the upper edge 810 by one or more sides 830 having one or more reflective inner surfaces 860, at least a portion of the reflective inner surfaces 860 oriented to be in light communication with the lower surface 140 of the TIR lens body 100 and to reflect light 700, 720 emitted from the lower surface 140 of the TIR lens body 100 and direct that reflected light 700, 720 through the lower opening 850 in the light reflector housing 800. In various example embodiments, the sides 830 may in part or in their entirety define one or more curved profiles, such as a parabola or any other suitable profile, as the sides 830 extend from an upper region 832 to a lower region 834. In various example embodiments the one or more reflective inner surfaces 860 of the light reflector housing 800 may comprise an array of planar reflective surfaces 860 each subtending a degrees around the perimeter, as shown in FIG. 8. In one example embodiment the array of planar reflective surfaces 860 comprises 30 wedges each subtending 12 degrees (α), and the wedges are each extruded out of 3002 Aluminum Alloy, 1.27 mm thick, which is provided with a polished reflective surface. In alternative embodiments (not shown), the inner surface 860 could comprise a smooth, continuous (not faceted) reflective surface, or any suitable textured surface, such as a continuous textured surface.

Figure 9:
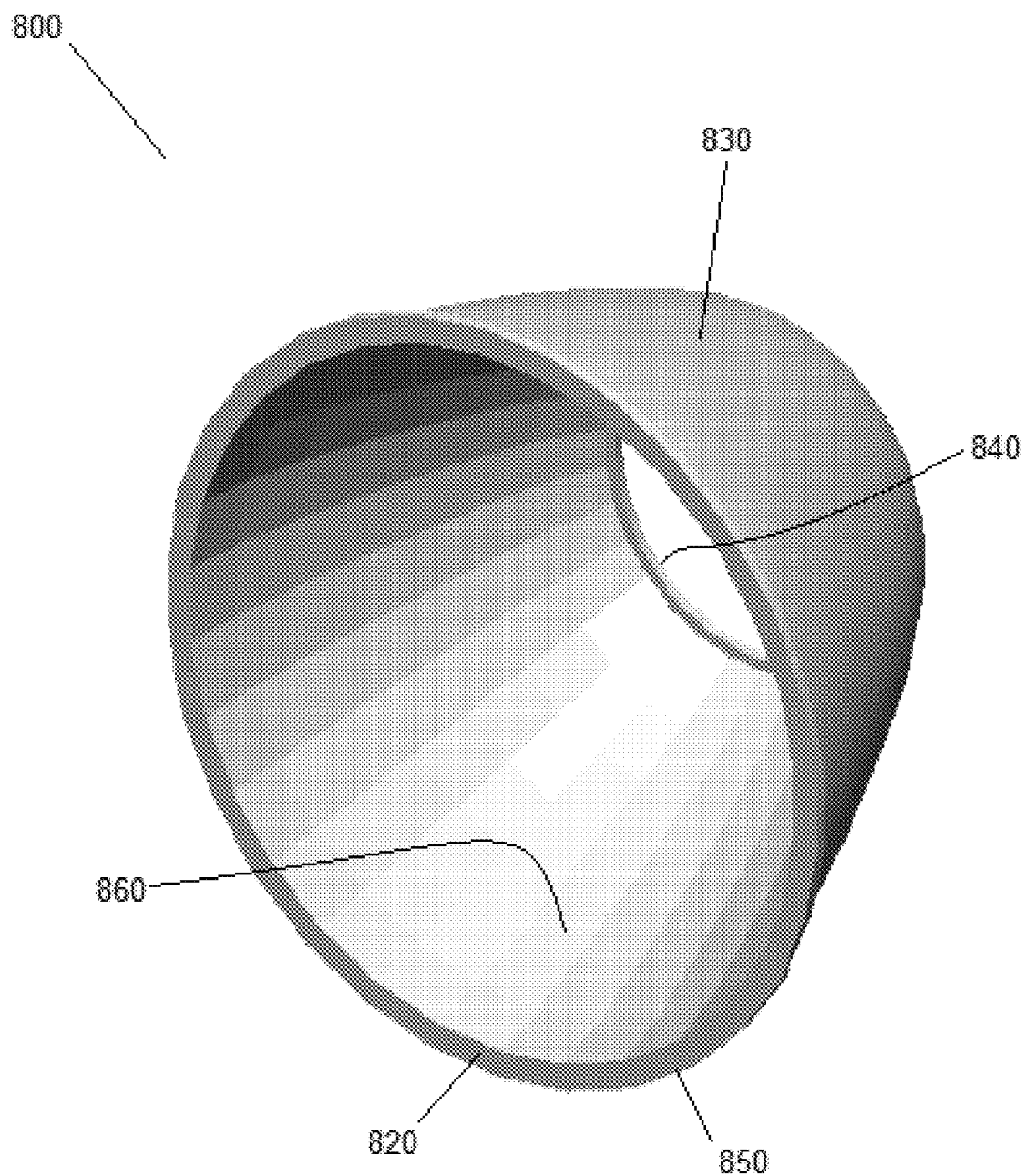
FIG. 9 is a bottom perspective view of the example light reflector of FIG. 8.
Figure 10:
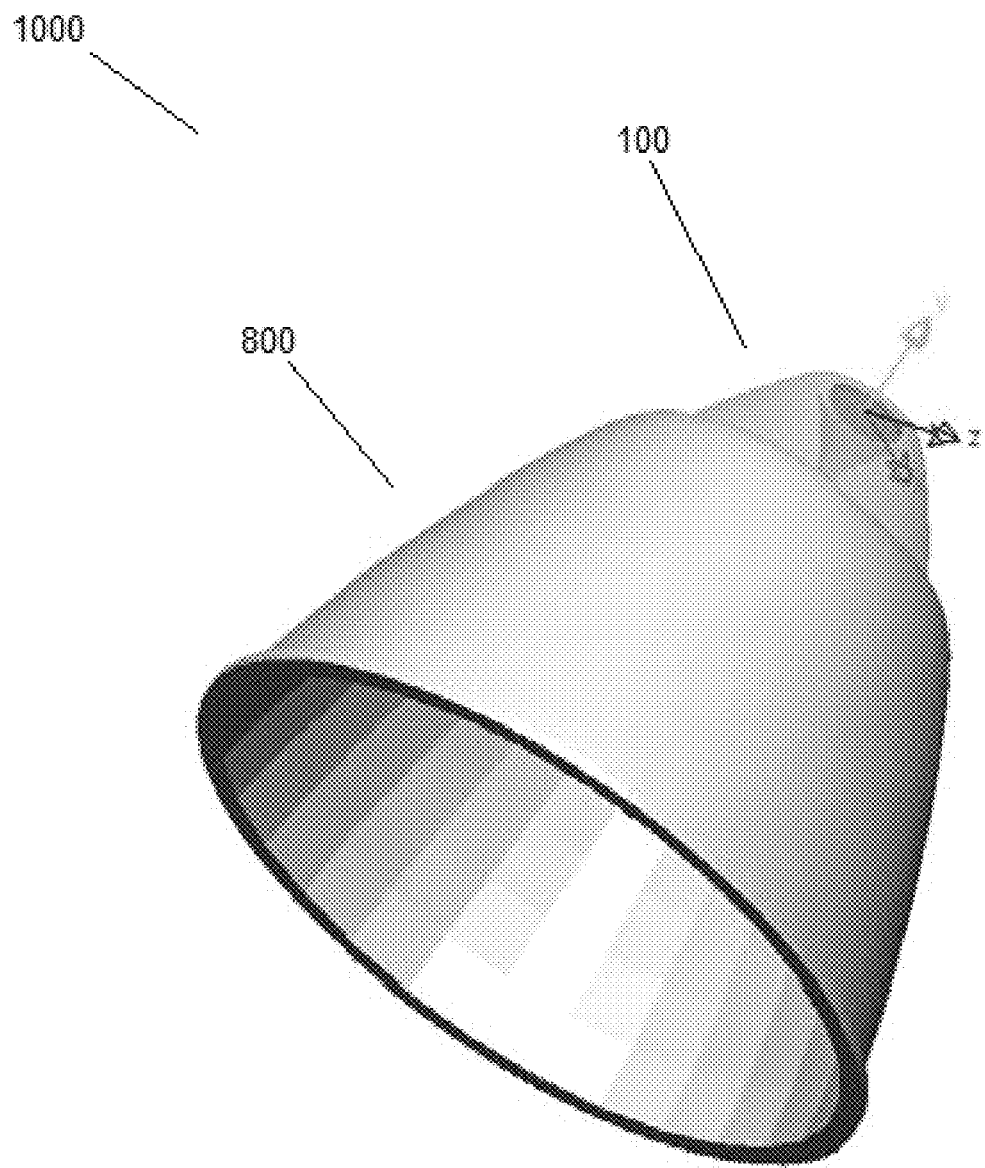
FIG. 10 is a bottom perspective view of an example embodiment of a lighting system comprising the example light reflector of FIG. 8 combined with the example TIR lens of FIG. 1.
Figure 16:
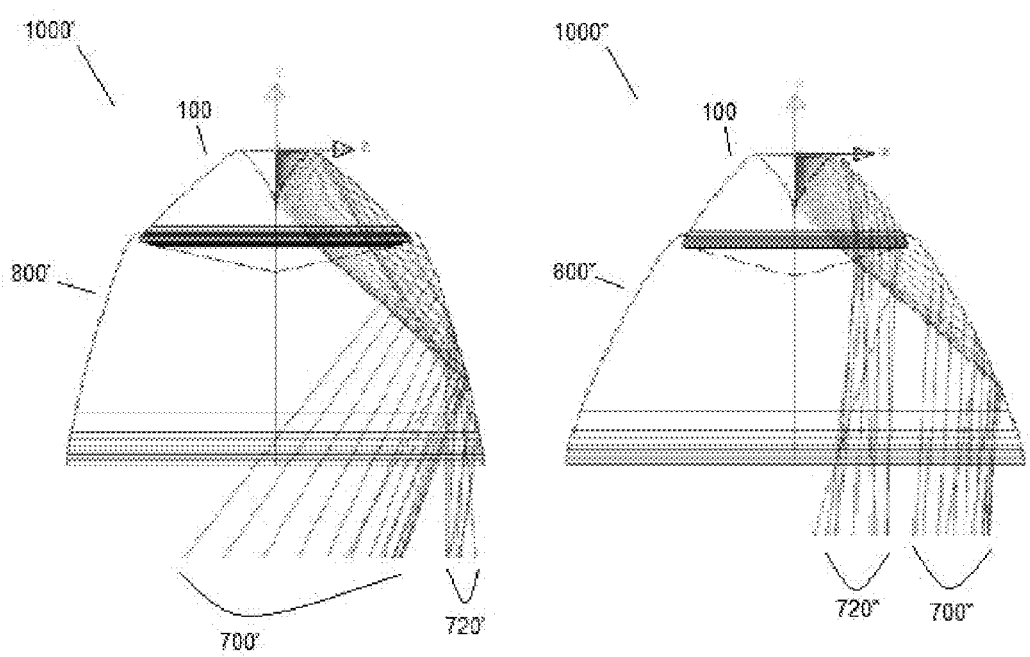
FIG. 16 is a transparent side elevation view of two example lighting systems utilizing the example TIR lens of FIG. 1 combined with other example light reflectors, showing example light paths through the lighting systems.

As illustrated in the example in FIG. 9, the reflector housing 800 may include a lip 840 defining the opening in the upper surface 810, and this lip 840 may rest on and/or engage the upper ridge 152 of the interstitial portion 150 of the TIR lens body 100, thereby removably engaging housing 800 with TIR lens body 100, as illustrated in FIG. 10. In those embodiments, a wide variety of reflector housings 800, 800', 800'', for instance as shown in FIG. 16, may be used in connection with a single TIR lens body 100, as long as the reflector housings 800 et seq. are provided with a consistent interface, such as lip 840. Any other suitable means may be provided to position housing 800 proximate the body 100 so that light from the lower surface 140 of the body 100 can be transmitted into the housing 800 though its upper opening 840. Alternatively, in certain embodiments such as wide-angle lighting, a reflector housing 800 may optionally be omitted entirely.

FIGS. 11 through 16 and 26 through 31 depict various example housing shapes 800, 800', 800'', 800-26, 800-27, 800-28, 800-29, 800-30, and 800-31, all used interchangeably with a single TIR lens body 100. In the corresponding example lighting systems 1000, 1000', 1000'', 2600, 2700, 2800, 2900, 3000, and 3100, the upper surface 110 of the TIR lens body 100 is located proximate to and in light communication with the LED light source and transmits substantially all the light 700, 720 transmitted from the LED light source into the body 100 of the TIR lens through the upper conical recess 180, and the TIR lens body 100 emits substantially all that light 700, 720 out of its lower surface 140 and into the light reflector housing 800, 800', 800'', 800-26, 800-27, 800-28, 800-29, 800-30, and 800-31, which is located proximate to the TIR lens body 100 and which reflects and directs at least some of the light 700, 720 emitted by the TIR lens body 100.

Figure 11:
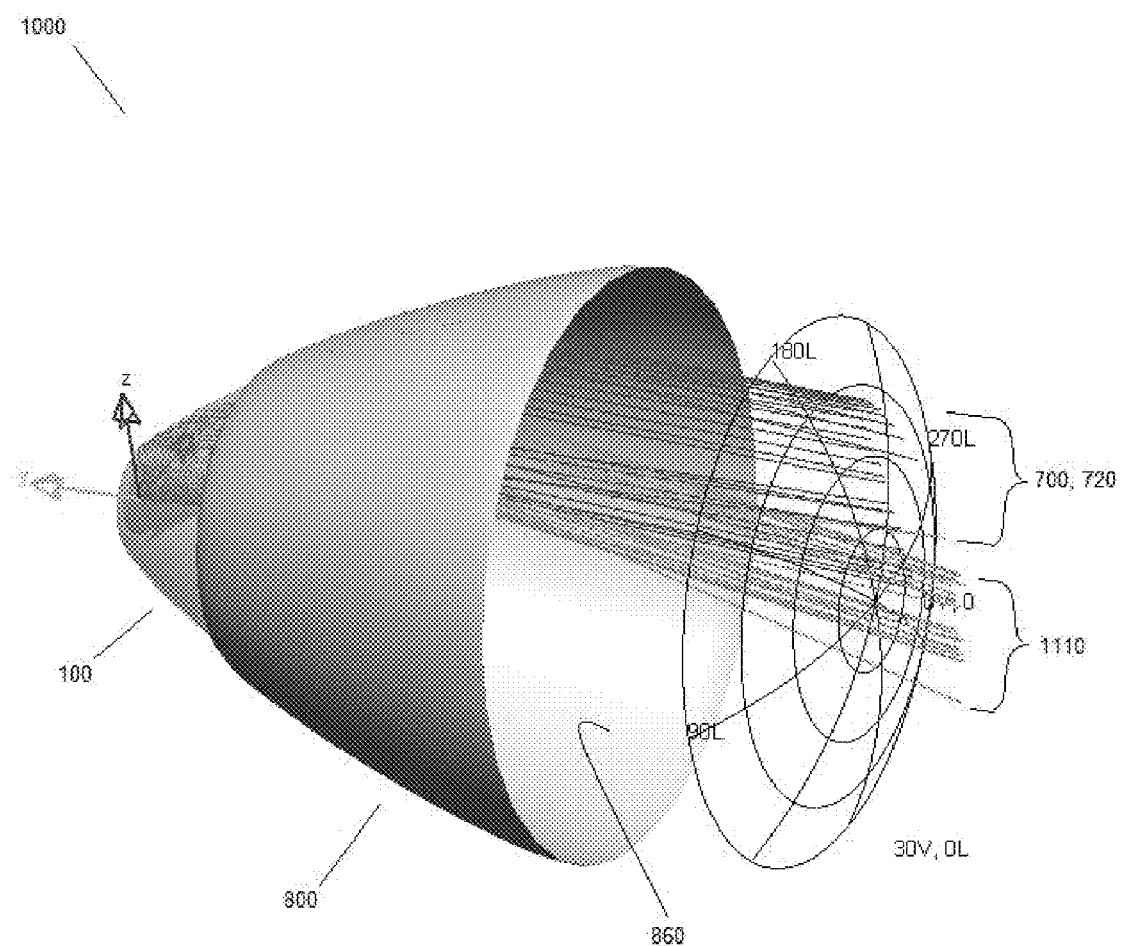
FIG. 11 is a bottom perspective view of the example lighting system of FIG. 10, showing example light paths through the lighting system.
Figure 12:
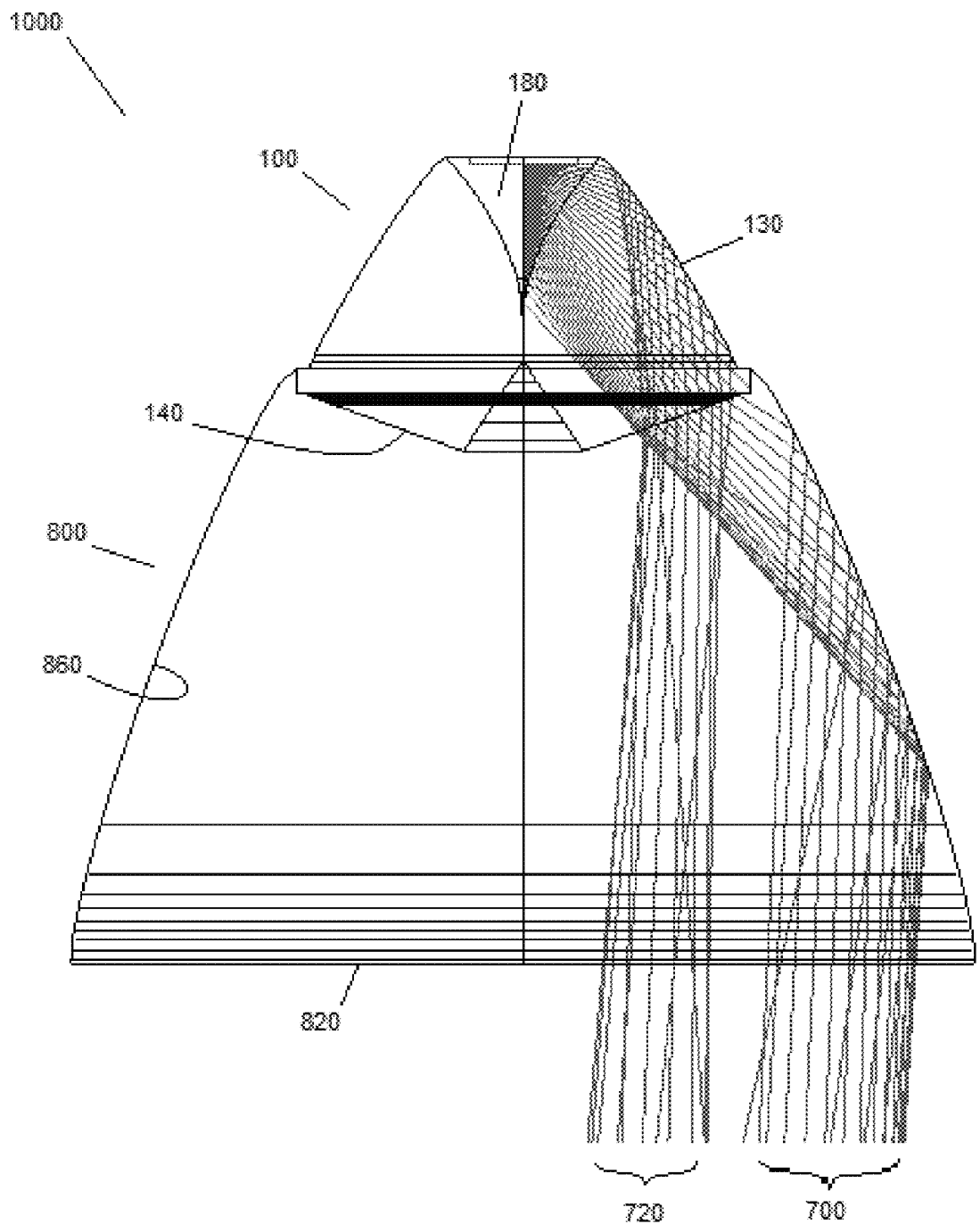
FIG. 12 is a transparent side elevation view of the example lighting system of FIG. 10, showing example light paths through the lighting system.
Figure 13:
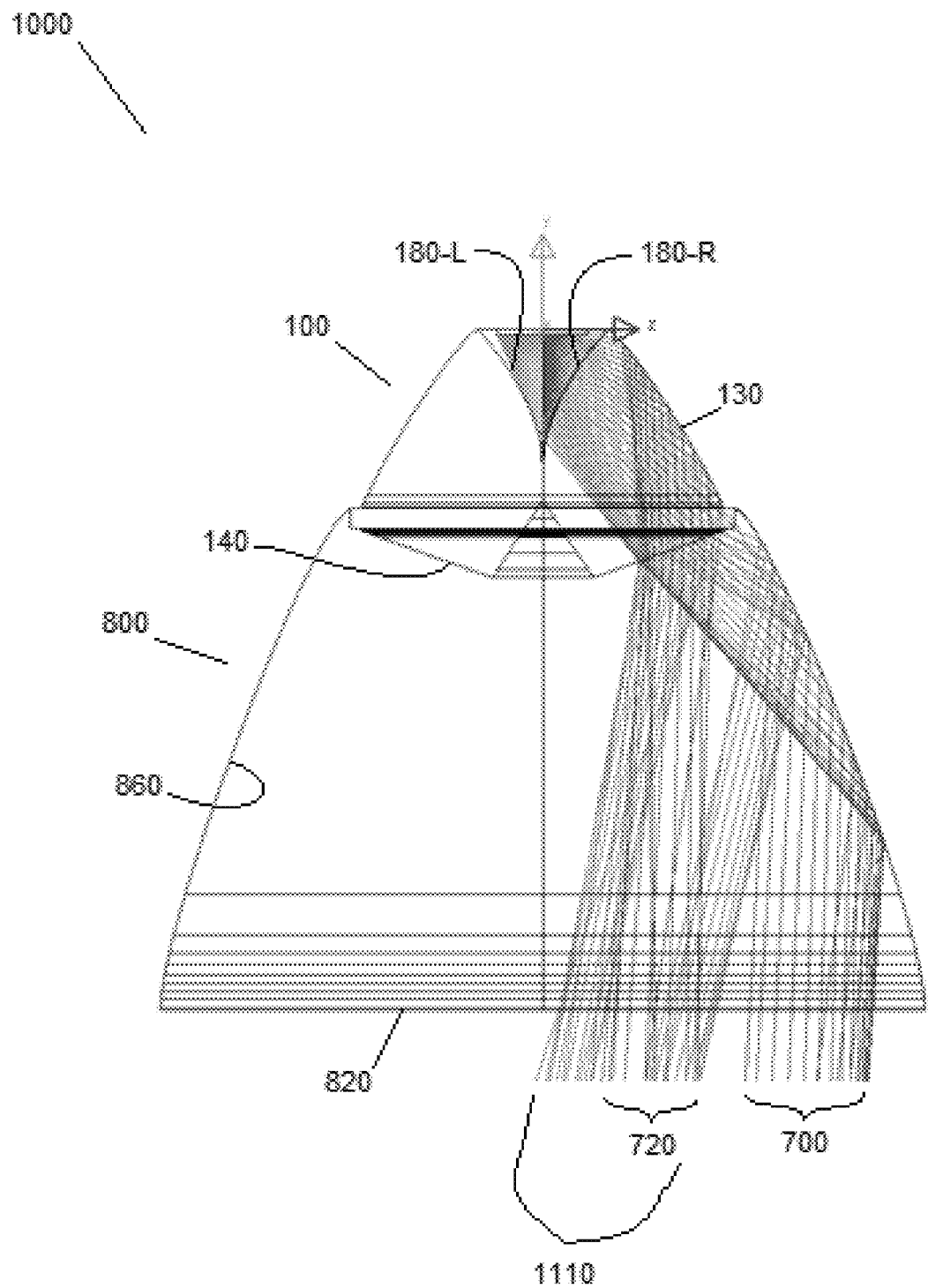
FIG. 13 is a transparent side elevation view of the example lighting system of FIG. 10, showing example light paths through the lighting system.
Figure 14:
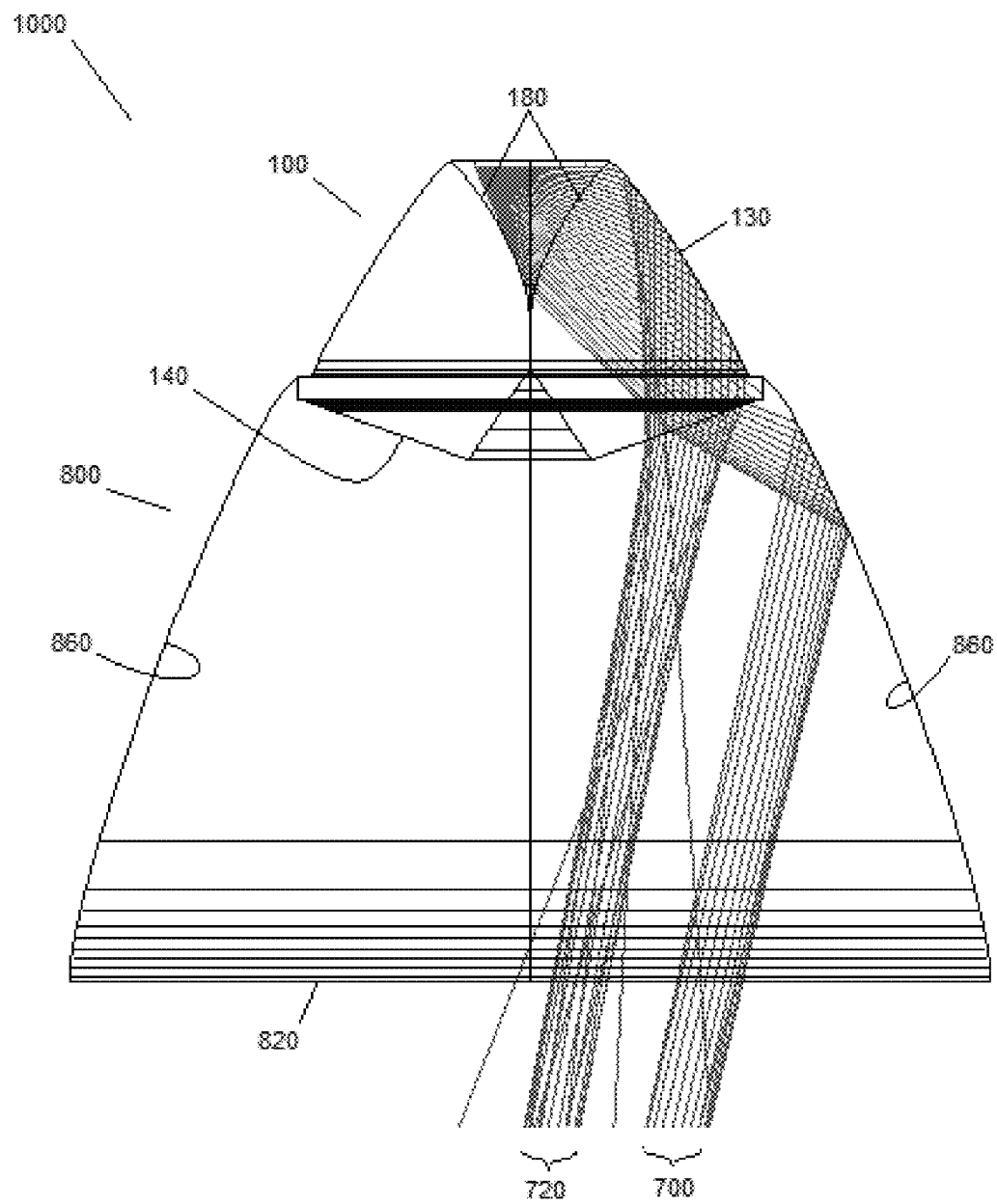
FIG. 14 is a transparent side elevation view of the example lighting system of FIG. 10, showing example light paths through the lighting system.
Figure 15:
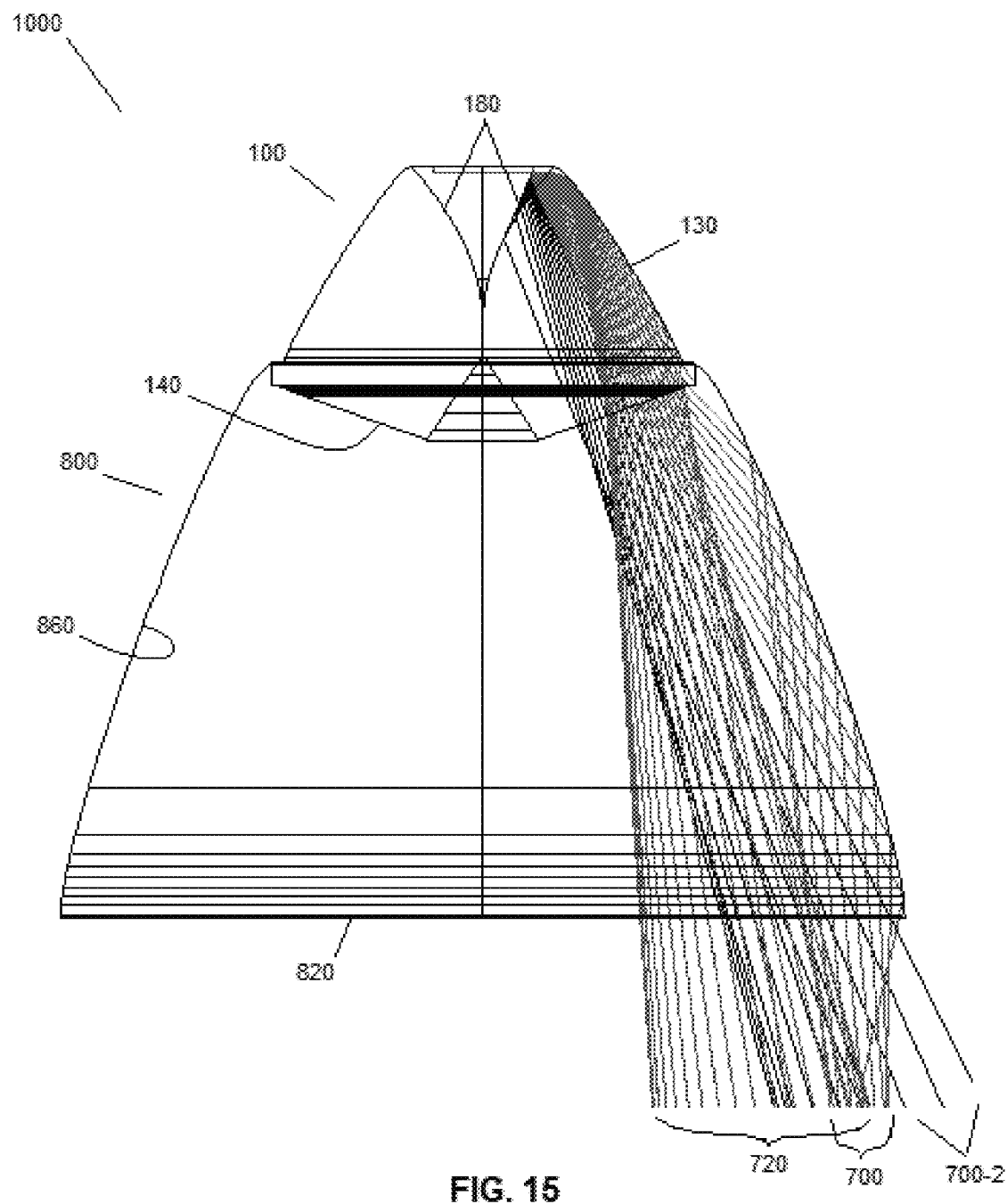
FIG. 15 is a transparent side elevation view of the example lighting system of FIG. 10, showing example light paths through the lighting system.

FIGS. 11 through 16 and 26 through 31 illustrate the impact on the light paths 700, 720 of these various example housing shapes, where light paths 700 represent light that has traveled through the TIR lens body 100 without being internally reflected, and light paths 720 represent light that has reflected inside the TIR lens body 100 before exiting it. FIG. 15 shows that in housing 800 some of the non-internally-reflected light rays 700 are reflected on the inner surface 860 of the housing 800, while other non-internally-reflected light rays 700-2 are not. FIGS. 26 through 31 provide the candela distributions 2610, 2710, 2810, 2910, 3010, and 3110 resulting from the respective systems, 2600, 2700, 2800, 2900, 3000, and 3100. FIGS. 11 and 13 note example flow paths of additional light rays 1110 that originate on the "left" side of the conical recess 180-L but enter the TIR lens body 100 on the "right" side of the conical recess 180-R, and then exit the TIR lens body 100 in the same fashion as light rays 700 and 720.

Figure 17:
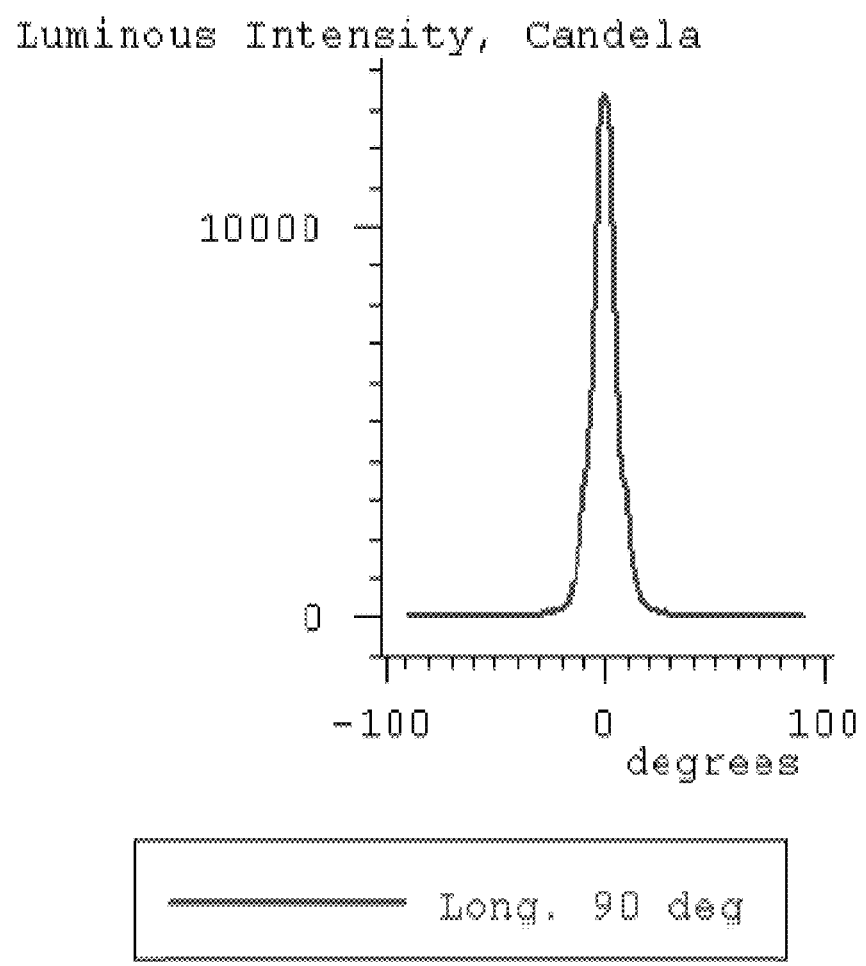
FIG. 17 is a graph depicting photometric data generated by a simulation of the example system shown in FIGS. 10 through 15.
Figure 18:
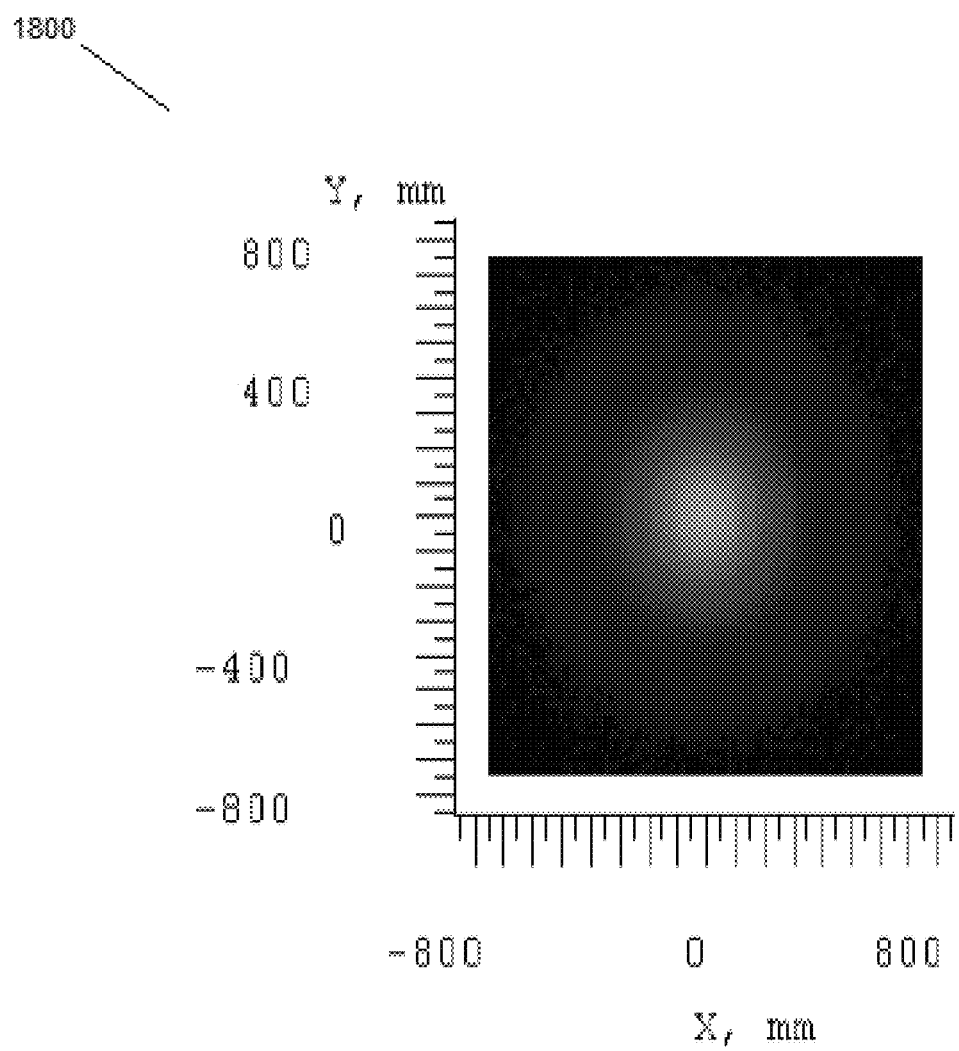
FIG. 18 is a simulation of the light output of the example system shown in FIGS. 10 through 15.
Figure 19:
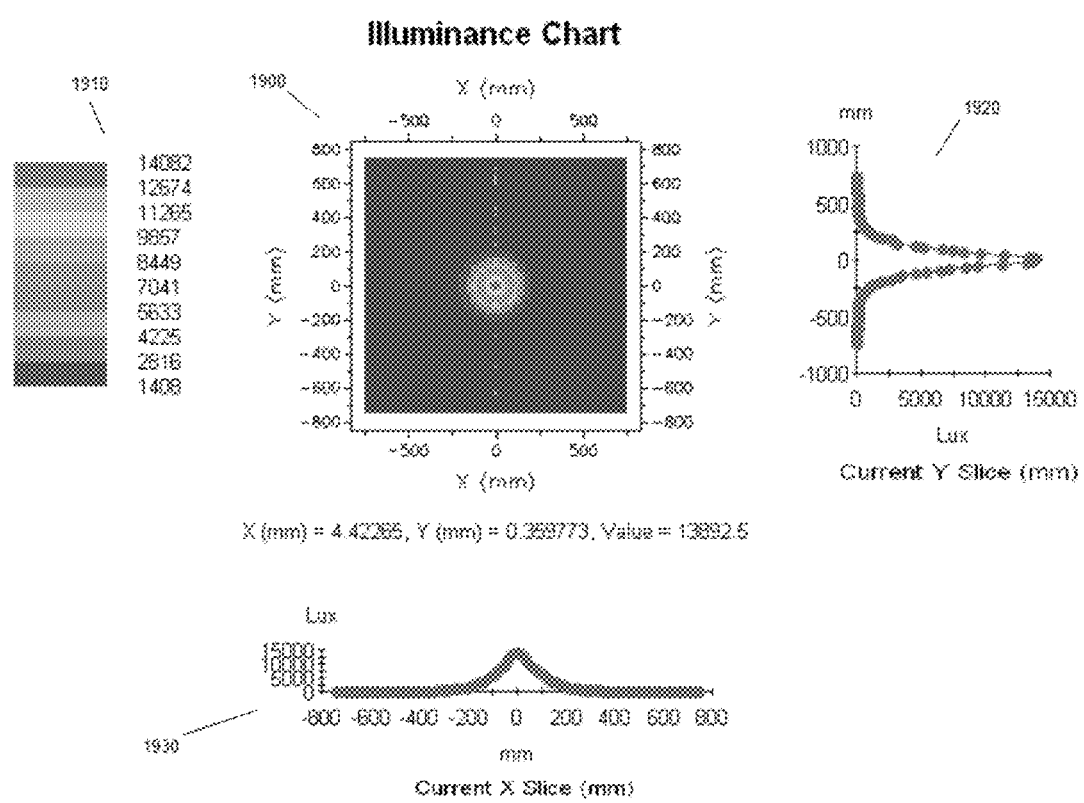
FIG. 19 is a display of photometric data generated by a simulation of the example system shown in FIGS. 10 through 15.
Figure 20:
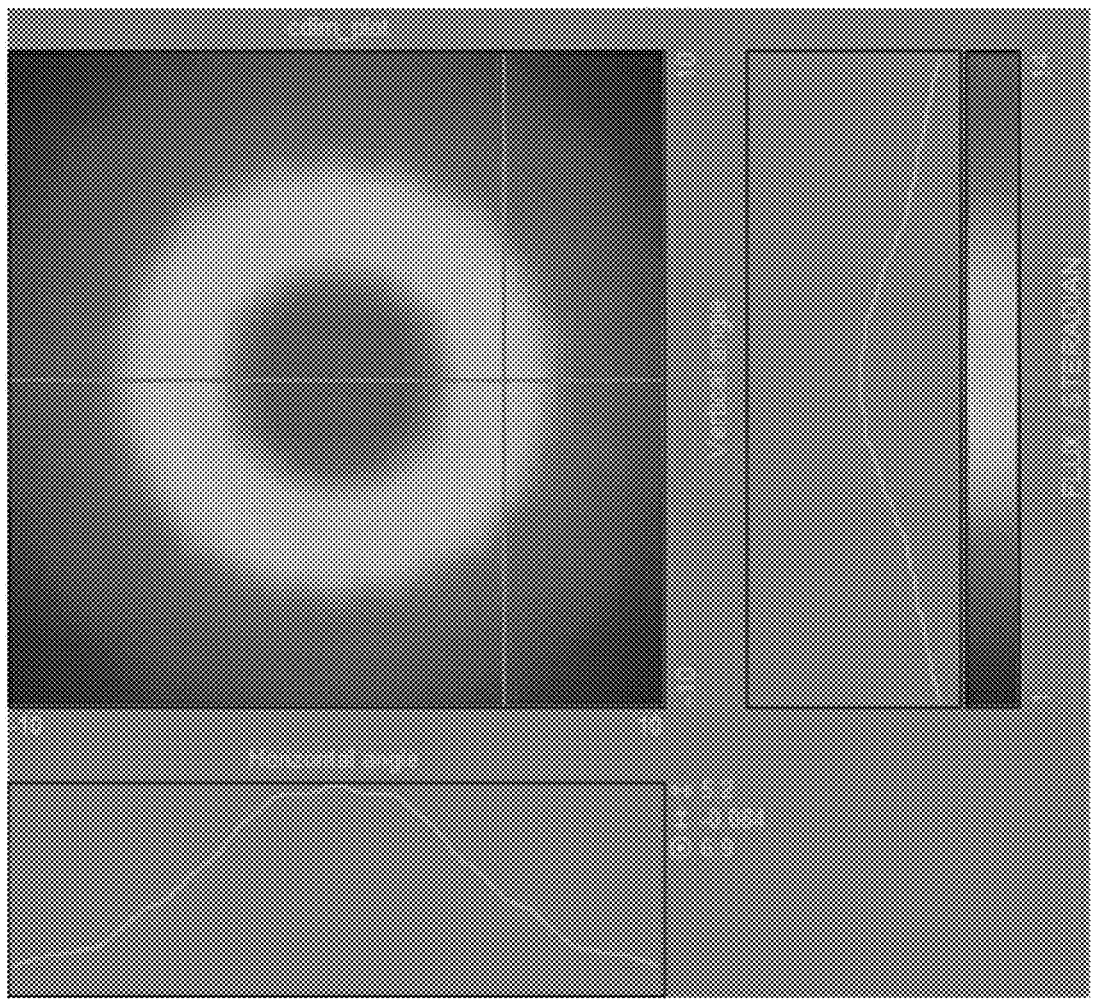
FIG. 20 is a display of photometric data generated by a simulation of the example system shown in FIGS. 10 through 15.
Figure 21:
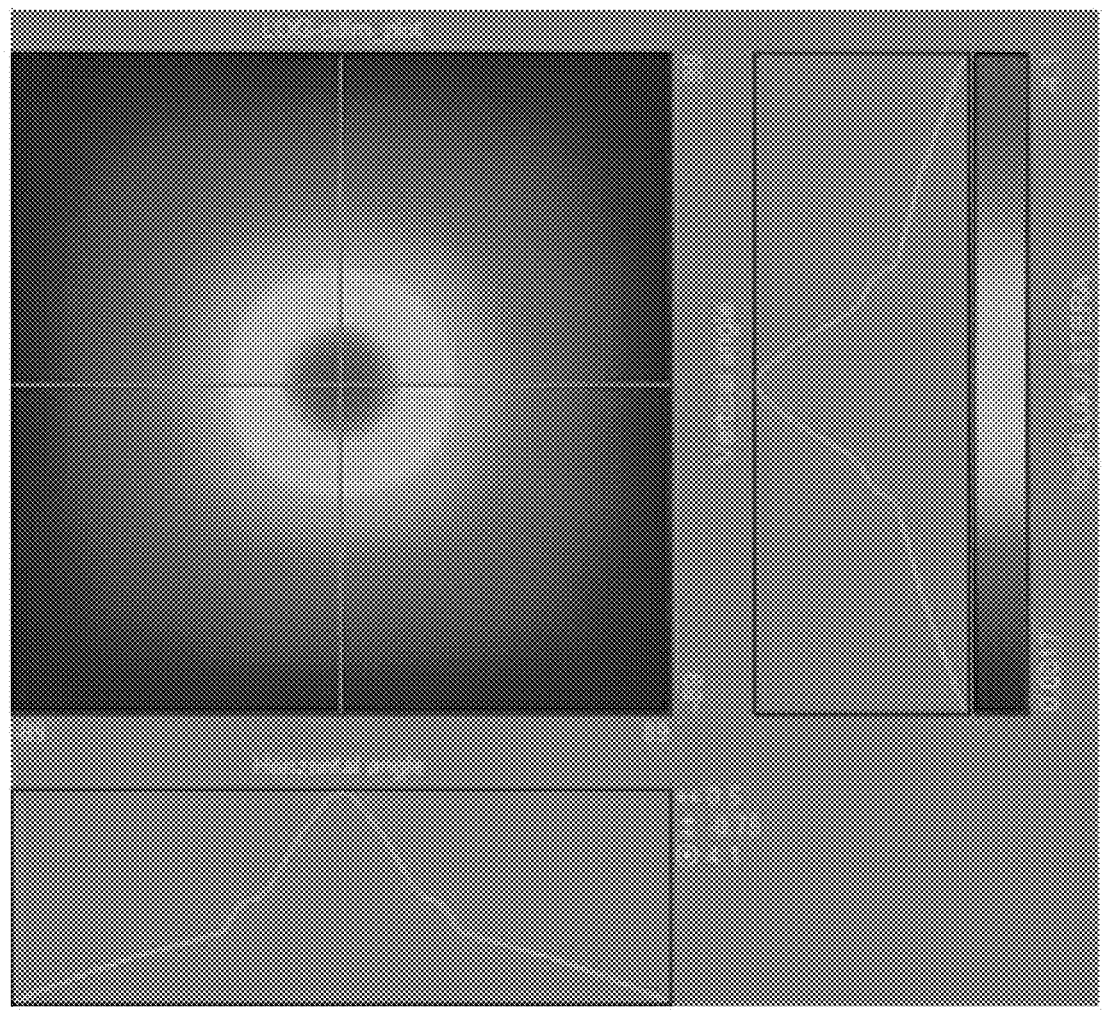
FIG. 21 is a display of photometric data generated by a simulation of the example system shown in FIGS. 10 through 15.
Figure 22:
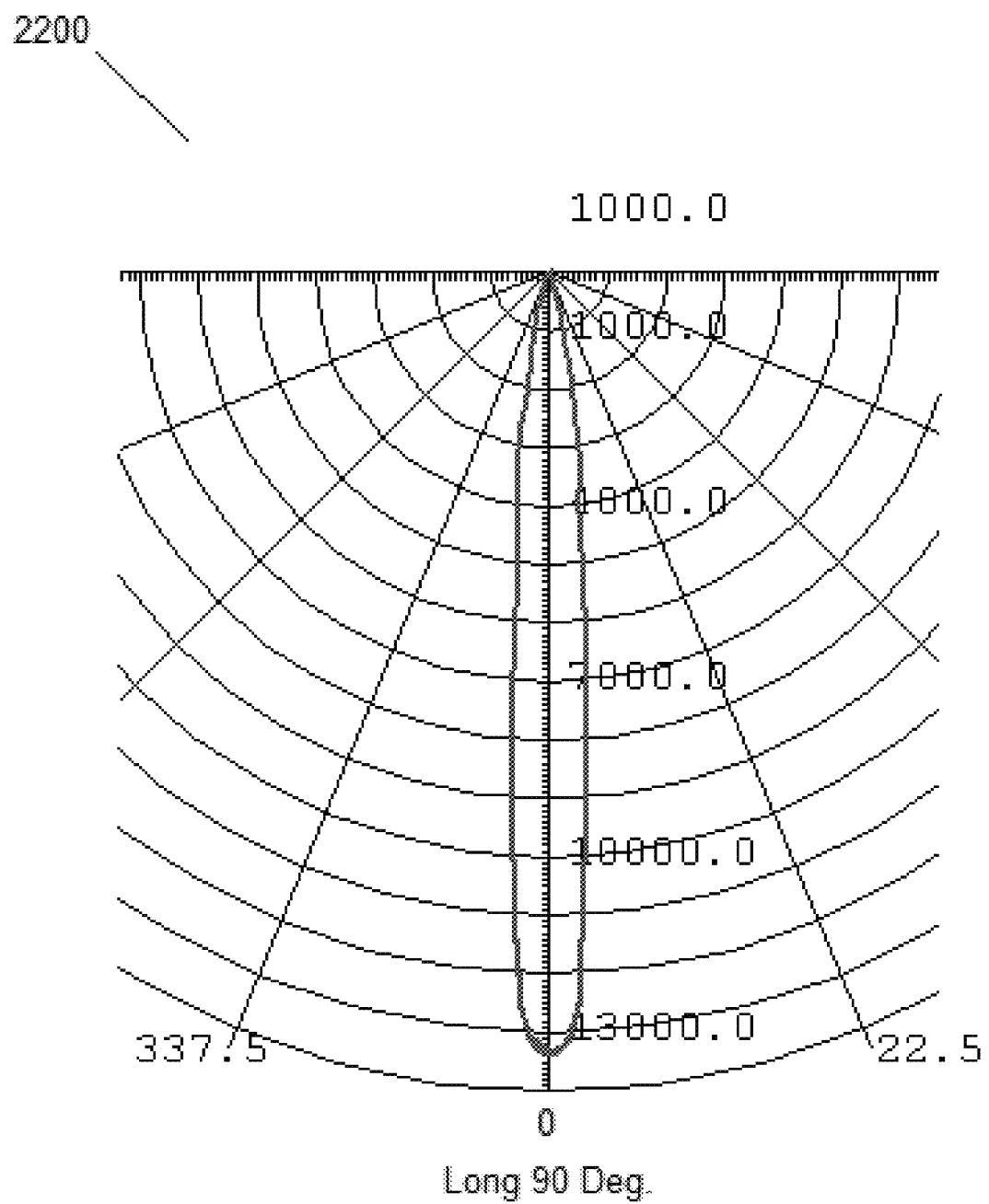
FIG. 22 is a candela distribution of the example lighting system of FIGS. 10 through 15 where the refractive index was 1.49.
Figure 23:
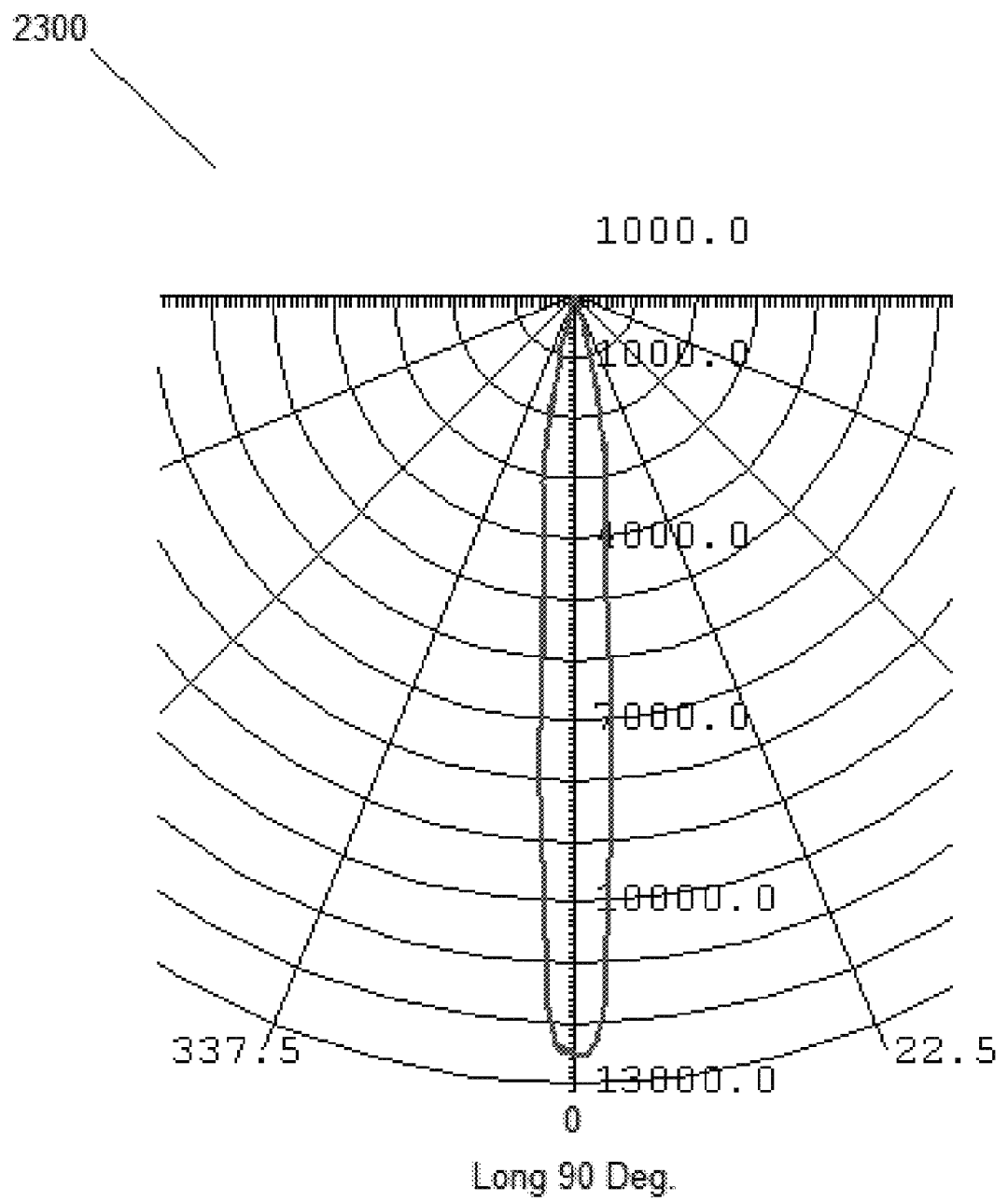
FIG. 23 is a candela distribution of the example lighting system of FIGS. 10 through 15 where the refractive index was 1.59.

FIGS. 17 through 23 illustrate various photometric data and information generated by simulation of a design of the example embodiment of the system 1000 shown in FIGS. 10 through 15. FIG. 17 depicts a luminous intensity, candela, chart 1700, showing the expected high-intensity, narrow beam of light produced by the system 1000. FIG. 18 depicts an illustration 1800 of what that high-intensity, narrow beam of light would look like. FIG. 19 provides further information regarding the intensity and narrowness of the beam of light, including an illuminance chart, 1900, corresponding legend 1910, and X and Y slice Lux charts, 1930, 1920, respectively. This confirms the symmetry and performance of the light beam generated by the system 1000. FIGS. 20 and 21 are simulations of the system 1000 provided by the vendor of the example TIR lens body 100, with FIG. 20 showing cd/lm vs. angle, and FIG. 21 showing a log cd/lm plot. The predicted FWHM was 10.4 degrees and the system 1000 was 86.0% efficient. Color rendering using the system 1000 is excellent, with CRI of 85 being standard, and CRI of 92 being readily achievable with a 10% reduction in lumen output. The impact of the refractive index was also evaluated. FIG. 22 is a candela distribution 2200 of the system 1000 where the outside diameter of the reflector was 3 inches, lens refractive index was 1.49, beam angle was 10.5 degrees, maximum intensity was 13452 cd, and optical efficiency was 85.7%. FIG. 23 is a candela distribution 2300 of the system 1000 where the same 3 inch reflector was used with a lens having a refractive index of 1.59. There, the beam angle was 10.2 degrees, maximum intensity was 12572 cd, and optical efficiency was 82.8%. Thus, changing the refractive index from 1.49 to 1.59 dropped the maximum beam intensity about 1000 cd, or 7.4%, and optical efficiency dropped by about 3%.

Figure 24:
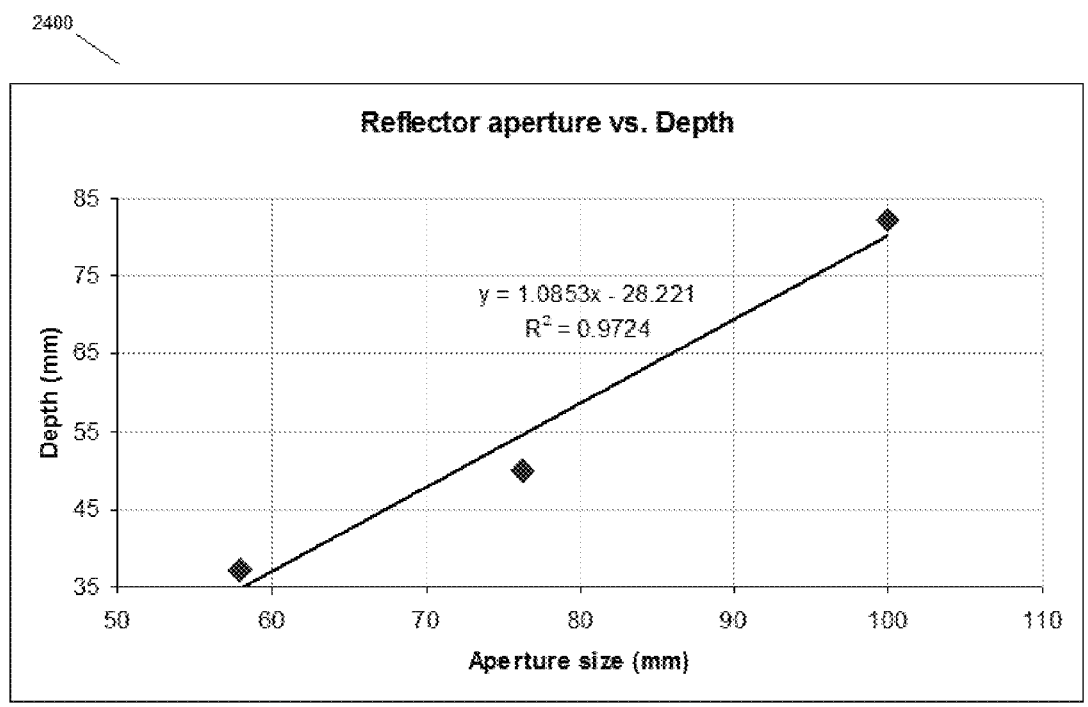
FIG. 24 is a graph depicting the relationship between the reflector aperture diameter and the reflector depth, for the example lighting system of FIGS. 10 through 15.
Figure 25:
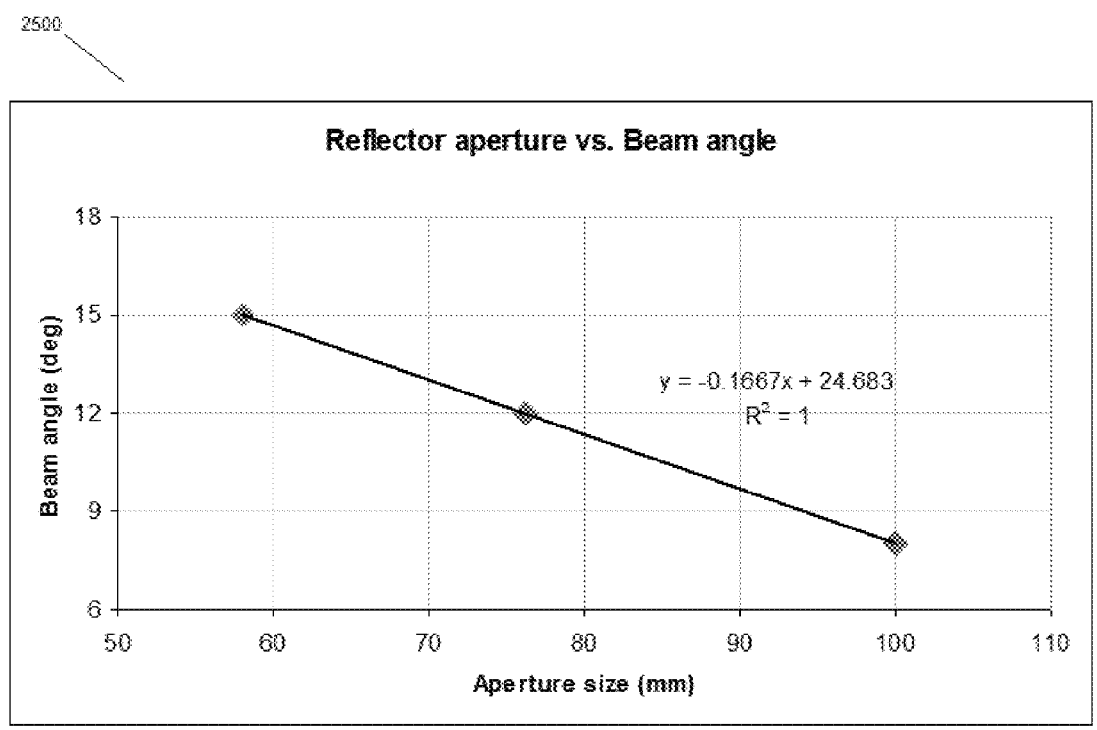
FIG. 25 is a graph depicting the relationship between the reflector aperture diameter and the beam angle, for the example lighting system of FIGS. 10 through 15.
Figure 26:
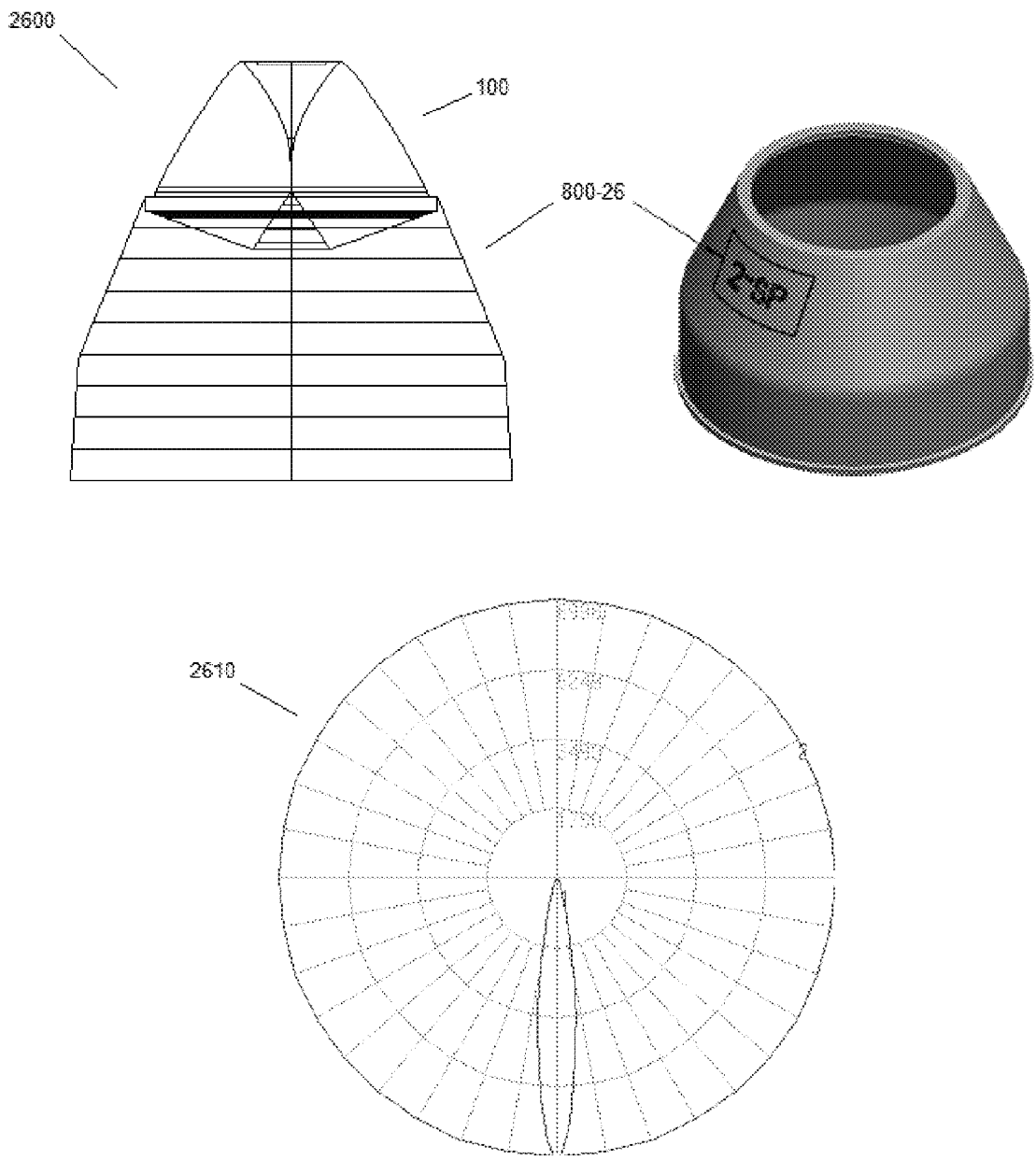
FIG. 26 depicts an example lighting systems utilizing the example TIR lens of FIG. 1 combined with an example light reflector sized and shaped differently than the example light reflector of FIG. 8, and depicting the resulting candela distribution of the system.
Figure 27:
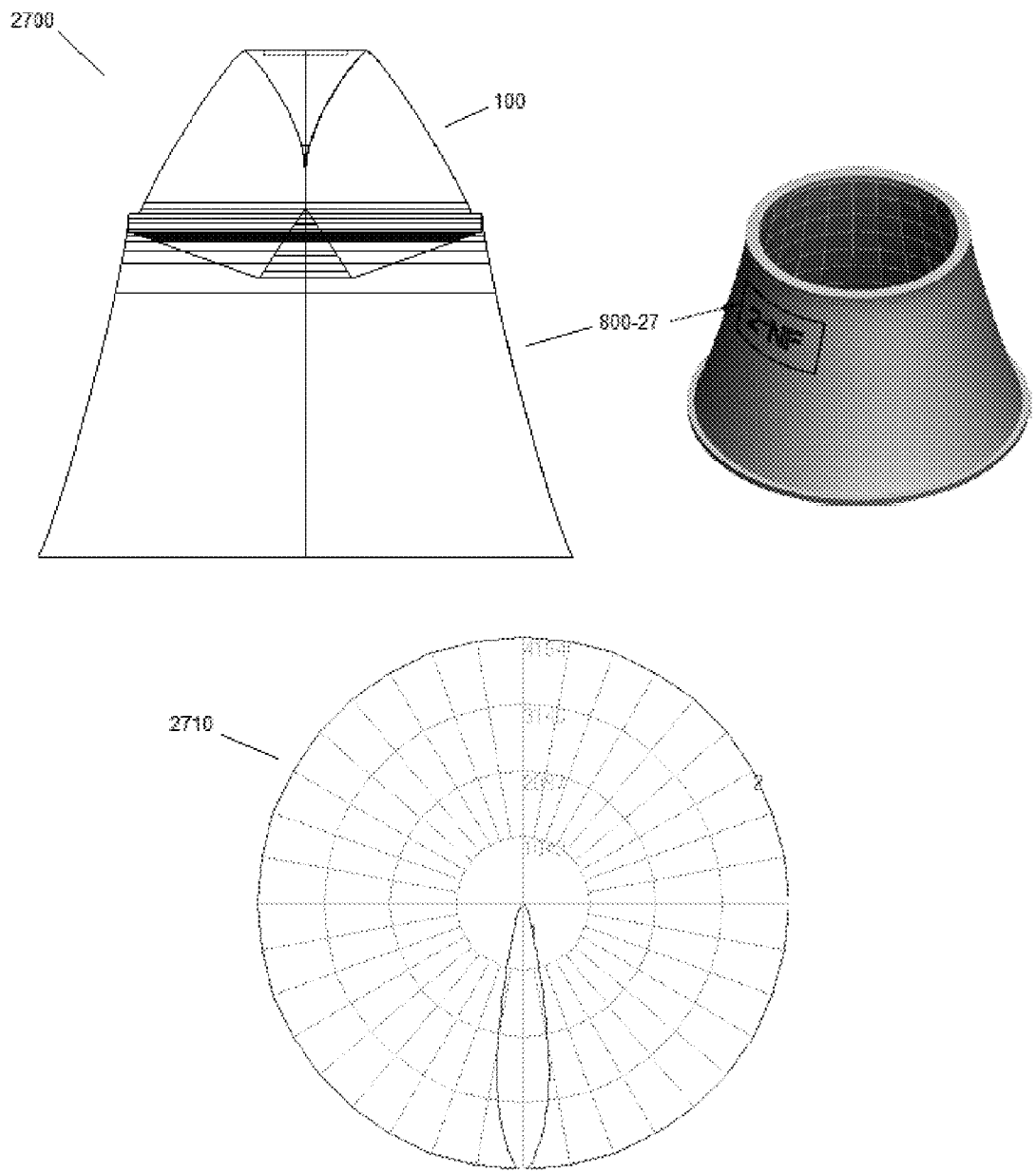
FIG. 27 depicts an example lighting systems utilizing the example TIR lens of FIG. 1 combined with an example light reflector sized and shaped differently than the example light reflector of FIG. 8, and depicting the resulting candela distribution of the system.
Figure 28:
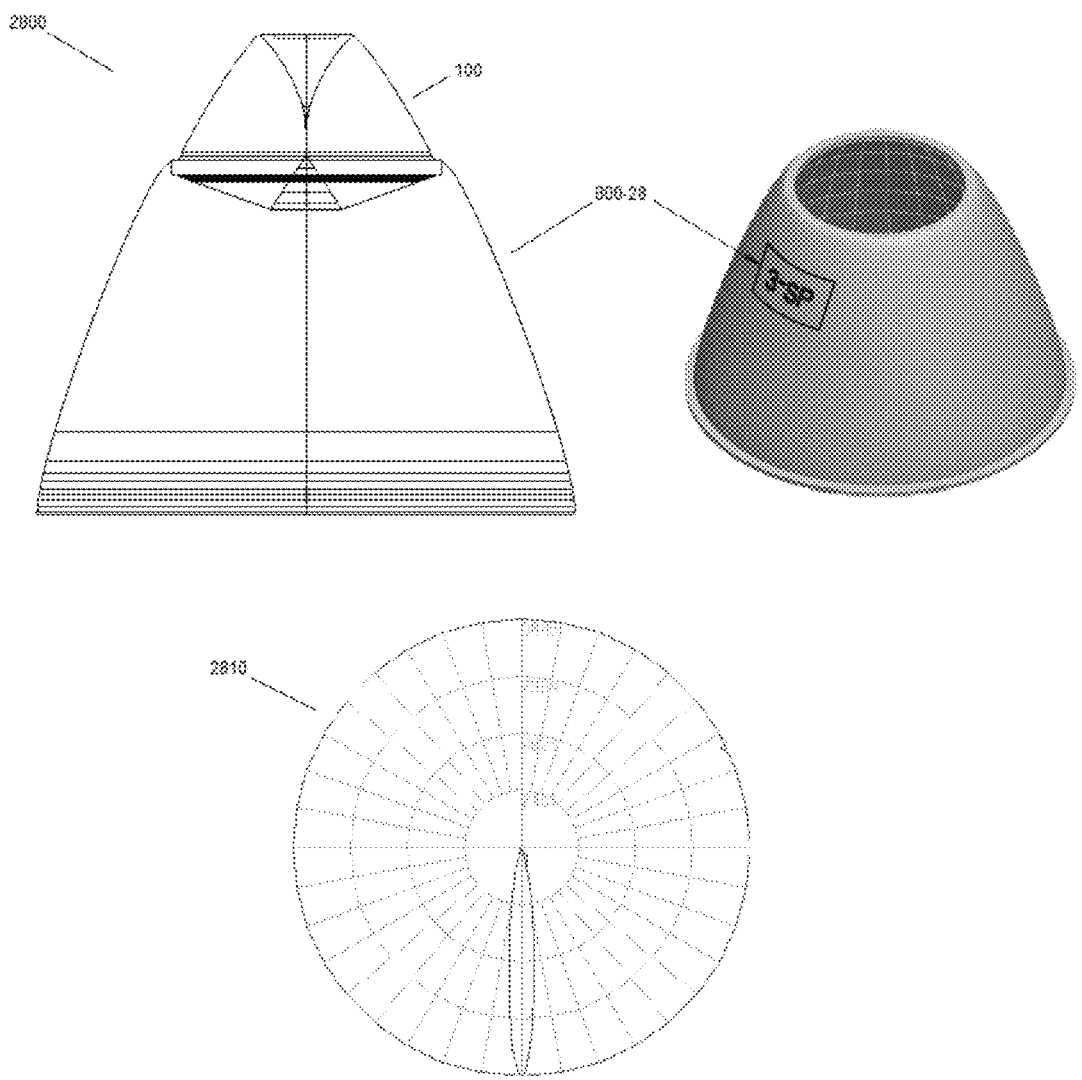
FIG. 28 depicts an example lighting systems utilizing the example TIR lens of FIG. 1 combined with an example light reflector sized and shaped differently than the example light reflector of FIG. 8, and depicting the resulting candela distribution of the system.
Figure 29:
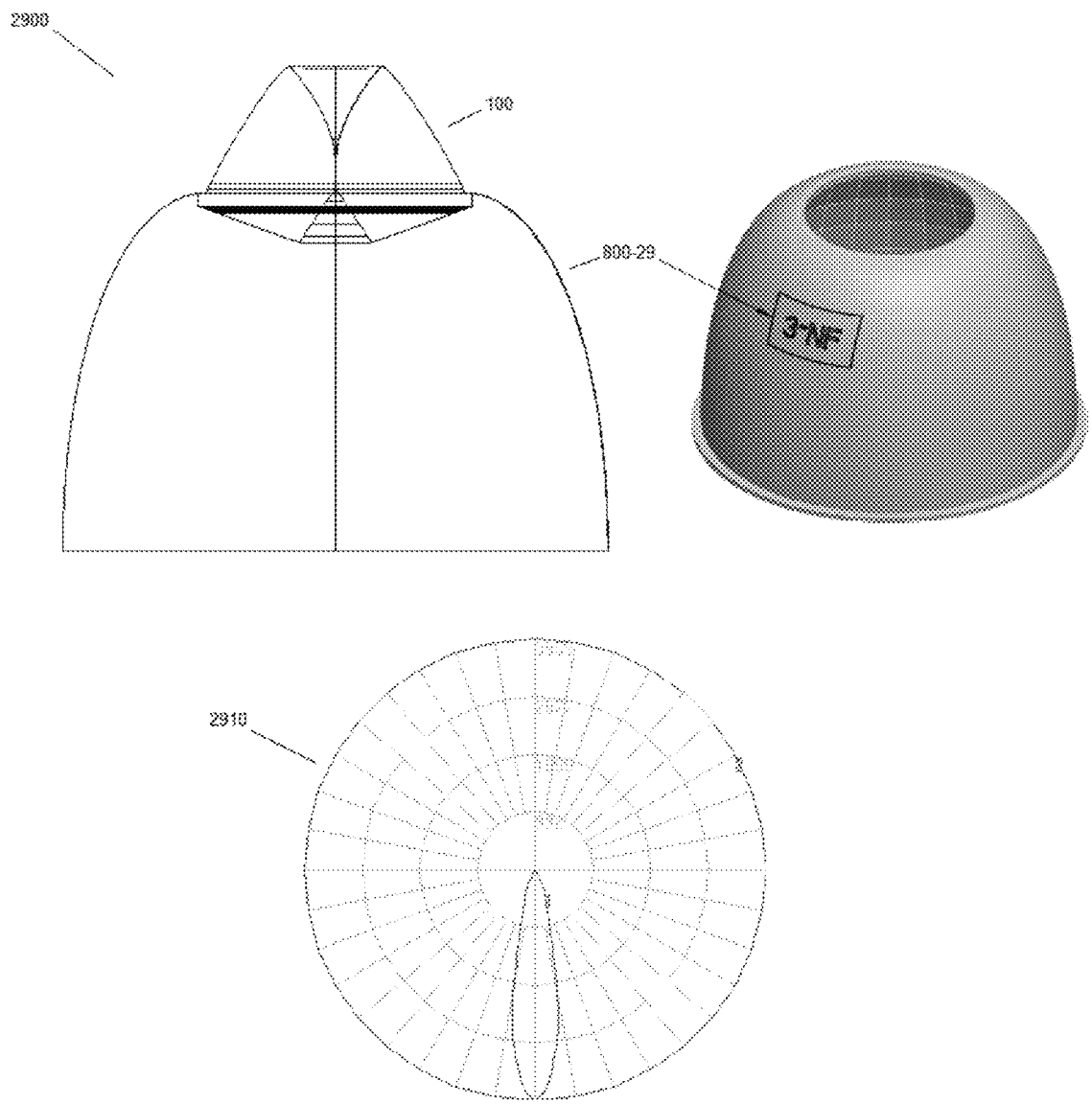
FIG. 29 depicts an example lighting systems utilizing the example TIR lens of FIG. 1 combined with an example light reflector sized and shaped differently than the example light reflector of FIG. 8, and depicting the resulting candela distribution of the system.
Figure 30:
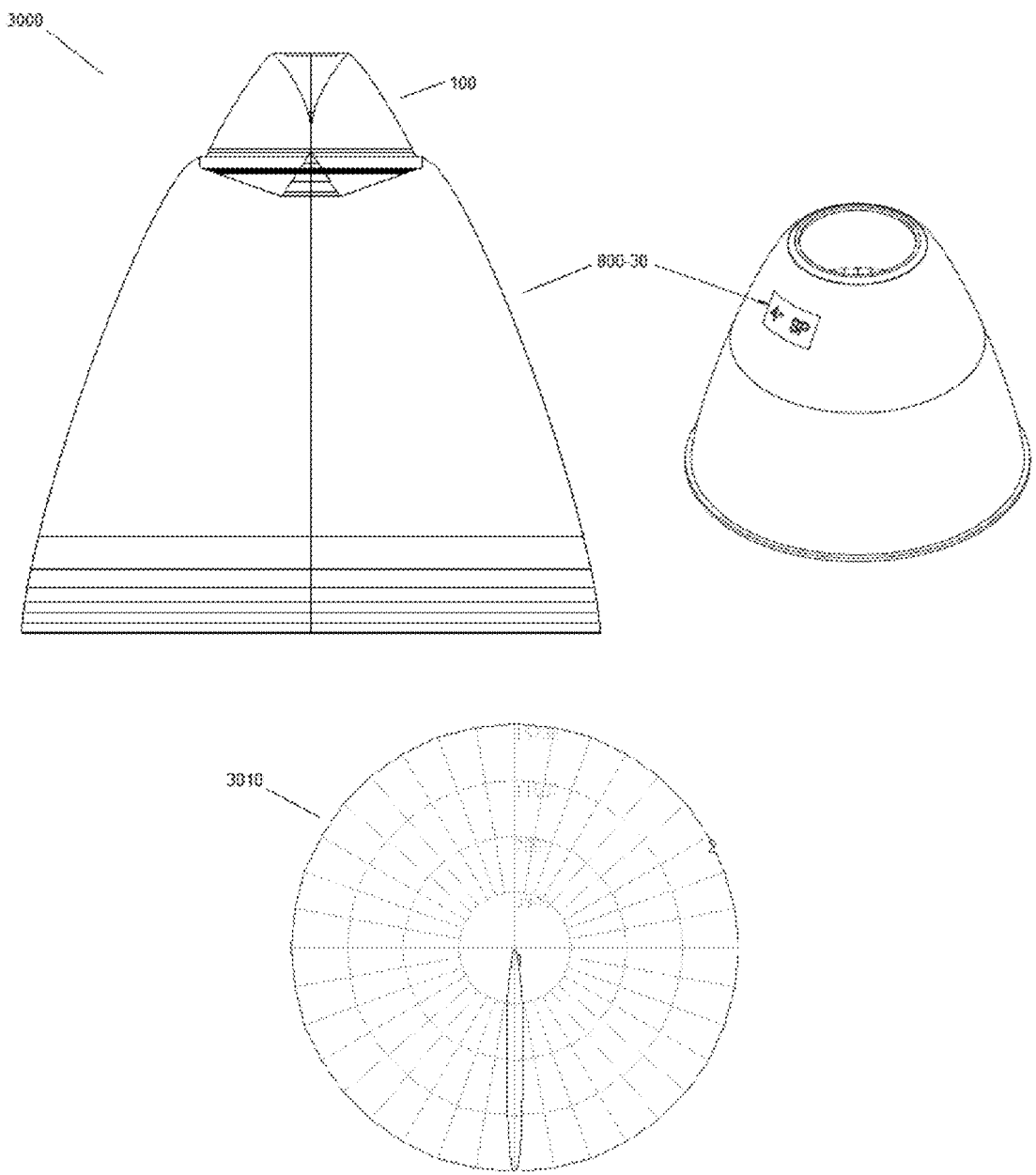
FIG. 30 depicts an example lighting systems utilizing the example TIR lens of FIG. 1 combined with an example light reflector sized and shaped differently than the example light reflector of FIG. 8, and depicting the resulting candela distribution of the system.
Figure 31:
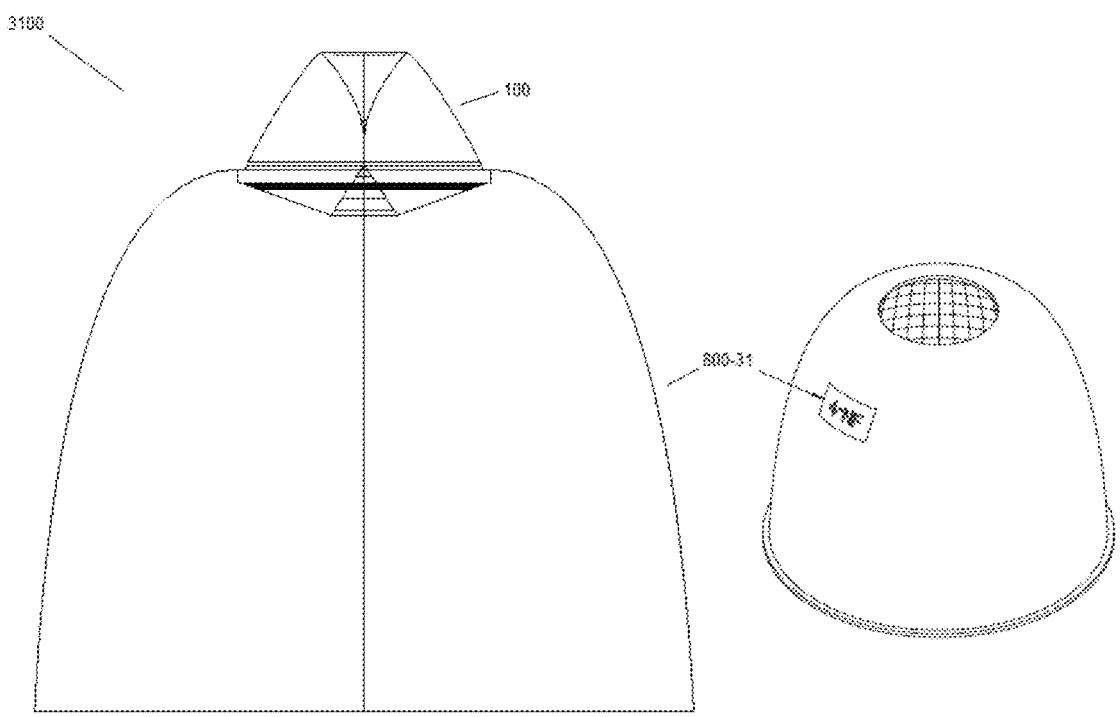
FIG. 31 depicts an example lighting systems utilizing the example TIR lens of FIG. 1 combined with an example light reflector sized and shaped differently than the example light reflector of FIG. 8, and depicting the resulting candela distribution of the system.
Figure 31:
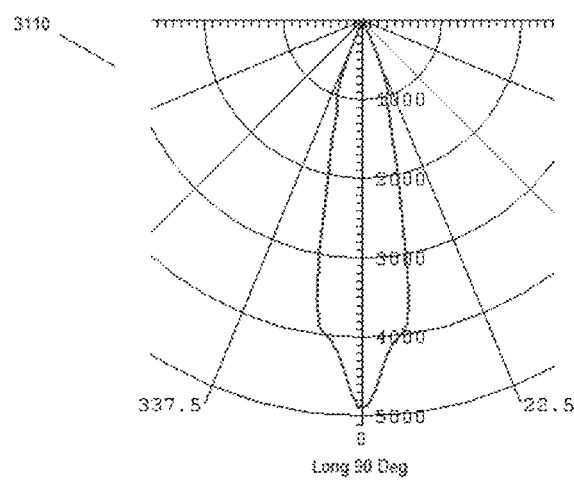

Guidelines for designing additional housings 800 for use in connection with the example TIR lens body 100 are provided in FIGS. 24 and 25. In FIG. 24, graph 2400 shows that the preferred relationship between the diameter of the reflector aperture 850 and the depth of the reflector (perpendicular distance from 810 to 820) can be derived from equation $Y=1.0853X-28.221$, where X is the diameter of the aperture and Y is the depth. Graph 2500 in FIG. 25 shows that the preferred relationship between the diameter of the reflector aperture 850 and the desired beam angle can be derived from equation $Y=-0.1667X+24.683$, where X is the diameter of the aperture in millimeters and Y is the beam angle in degrees. Different design guidelines may be derived with respect to different designs of TIR lens body 100, as will be apparent to persons of skill in the art.

The above devices, structures, methods, and functionalities are set forth to illustrate general concepts. Numerous other devices, structures, methods, and functionalities, and combinations and permutations thereof, are contemplated, and are inherently and necessarily disclosed to persons of ordinary skill in the art by the description and drawings herein.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that is allowed by the patent office based on this or any related patent application.

What is claimed is:

1. A lighting system comprising:
   a. an LED light source;
   b. a TIR lens adapted to be located proximate to and in light communication with the LED light source and transmit substantially all the light transmitted from the LED light source into the body of the TIR lens, the TIR lens further adapted to emit substantially all the light transmitted from the LED light source out of one or more surfaces adapted to be located proximate to a light reflector, wherein the at least one surface proximate to the light reflector comprises a reflecting structure adapted to reflect a portion of the light into the TIR lens; and
   c. one or more light reflectors adapted to be located proximate to the light emitting surfaces of the TIR lens and to reflect and direct light emitted by the TIR lens.

2. The lighting system of claim 1, wherein the light emitted by the system is substantially collimated.

3. The lighting system of claim 1, wherein the light emitted by the system is substantially free of striations.

4. The lighting system of claim 1, wherein the light emitted by the system transitions smoothly from center beam to outer edge.

5. The lighting system of claim 1, wherein substantially all the light emitted by the system passes through the TIR lens.

6. The lighting system of claim 1, wherein the optical efficiency of the system is at least 80%.

7. The lighting system of claim 1, wherein the Full Width at Half Maximum (FWHM) generated by the system is 12 degrees or less.

8. The lighting system of claim 1, wherein the TIR lens is adapted to interchangeably interface with a plurality of light reflectors differing in geometries and light directing characteristics.

9. The lighting system of claim 1, further comprising a plurality of light reflectors differing in geometries and light directing characteristics, each light reflector adapted to interchangeably interface with the TIR lens.

10. The lighting system of claim 1, wherein the TIR lens is located proximate to and in light communication with the LED light source and transmits substantially all the light transmitted from the LED light source into the body of the TIR lens, and the TIR lens emits substantially all the light transmitted from the LED light source out of one or more surfaces that are located proximate to one or more light reflectors that reflect and direct the light emitted by the TIR lens.

11. An optic comprising:
   a. a TIR lens defining a one-piece body having a truncated, conical upper portion, and a truncated conical lower portion, the lower portion positioned opposite the upper portion, the upper portion having an upper surface defining a first centrally-located conical recess into the body that is adapted to be located proximate to and in light communication with a LED light source and transmit substantially all the light transmitted from the LED light source into the body of the TIR lens, the remainder of the upper surface adapted by the upper surface's geometry to mute the emission of light from inside the body by reflecting light back into the body, the lower portion having a lower surface adapted to emit substantially all the light from inside the body, the lower surface defining a second centrally-located conical recess into the body that is adapted by its the lower surface's geometry to at least partially mute the emission of light from inside the body by reflecting at least a portion of the light back into the body.

12. The optic of claim 11, wherein the outer surface of the conical upper portion defines a convex profile.

13. The optic of claim 11, wherein the inner surface of the first centrally-located conical recess defines a convex profile.

14. The optic of claim 11, wherein the body comprises optical grade polymethylmethacrylate (PMMA).

15. The optic of claim 11, wherein the body is formed by injection molding.

16. A lighting system comprising:
   a. an LED light source;
   b. a TIR lens defining a one-piece body having a truncated, conical upper portion, a truncated conical lower portion, and an interstitial portion, the lower portion positioned opposite the upper portion and the interstitial portion positioned between the upper and lower portions, the upper portion having an upper surface defining a first centrally-located conical recess into the body that is adapted to be located proximate to and in light communication with the LED light source and transmit substantially all the light transmitted from the LED light source into the body of the TIR lens, the remainder of the upper surface adapted by the upper surface's geometry to mute the emission of light from inside the body by reflecting light back into the body, the lower portion having a lower surface adapted to emit substantially all the light from inside the body, the lower surface defining a second centrally-located conical recess into the body that is adapted by lower surface's geometry to at least partially mute the emission of light from inside the body by reflecting at least a portion of the light back into the body, the interstitial portion adapted to be located proximate to an opening in an upper surface of a light reflector; and c. a light reflector comprising a housing having an upper edge defining an upper opening adapted to be located proximate to the interstitial portion of the TIR lens and to allow light emitted from the lower surface to travel into the housing, the housing having a lower edge opposite the upper edge and defining a lower opening larger in area than the upper opening, the upper edge separated from the lower edge by one or more sides having one or more reflective inner surfaces, at least a portion of the reflective inner surfaces oriented to be in light communication with the lower surface of the TIR lens and to reflect light emitted from the lower surface of the TIR lens and direct that reflected light through the lower opening in the light reflector housing.

17. The lighting system of claim 16, wherein the outer surface of the conical upper portion defines a convex profile.

18. The lighting system of claim 16, wherein the inner surface of the first centrally-located conical recess defines a convex profile.

19. The lighting system of claim 16, wherein the one or more reflective inner surfaces of the light reflector comprise an array of planar reflective surfaces.

20. The lighting system of claim 16, wherein the TIR lens is located proximate to and in light communication with the LED light source and transmits substantially all the light transmitted from the LED light source into the body of the TIR lens, and the TIR lens emits substantially all the light transmitted from the LED light source out of the lower surface and into the light reflector housing, which is located proximate to the TIR lens and which reflects and directs the light emitted by the TIR lens.

21. The lighting system of claim 1, wherein the reflecting structure comprises a recess.

22. The lighting system of claim 1, wherein the reflecting structure comprises a conical recess.

\* \* \* \* \*